(12) United States Patent
McGuffie et al.

(10) Patent No.: US 11,643,248 B2
(45) Date of Patent: May 9, 2023

(54) NESTABLE ANIMAL CONTAINMENT CAGE BASES AND COVERS AND NESTING PROCESSES

(71) Applicant: INNOVIVE, INC., San Diego, CA (US)

(72) Inventors: Francesca McGuffie, San Diego, CA (US); Dee L. Conger, Alpine, WY (US); Daniel Romane, San Diego, CA (US)

(73) Assignee: Innovive, Inc., San Diego, CA (US)

( * ) Notice: Subject to any disclaimer, the term of this patent is extended or adjusted under 35 U.S.C. 154(b) by 54 days.

(21) Appl. No.: 16/973,399

(22) PCT Filed: Jun. 14, 2019

(86) PCT No.: PCT/US2019/037214
§ 371 (c)(1),
(2) Date: Dec. 8, 2020

(87) PCT Pub. No.: WO2019/245903
PCT Pub. Date: Dec. 26, 2019

(65) Prior Publication Data
US 2021/0284388 A1    Sep. 16, 2021

Related U.S. Application Data

(60) Provisional application No. 62/686,583, filed on Jun. 18, 2018.

(51) Int. Cl.
*B65D 21/02* (2006.01)
*A01K 1/03* (2006.01)
*A01K 5/00* (2006.01)

(52) U.S. Cl.
CPC .......... *B65D 21/0233* (2013.01); *A01K 1/031* (2013.01); *A01K 5/00* (2013.01)

(58) Field of Classification Search
CPC ...... B65D 21/0233; A01K 1/031; A01K 5/00; A01K 1/025
USPC .......................................... 119/452
See application file for complete search history.

(56) References Cited

U.S. PATENT DOCUMENTS

| | | | | |
|---|---|---|---|---|
| 3,381,663 A | * | 5/1968 | Dayton | A01K 1/03 119/467 |
| 4,787,382 A | * | 11/1988 | Pekovic | A61D 7/04 119/497 |
| 2005/0066908 A1 | * | 3/2005 | Park | A01K 1/031 119/419 |
| 2007/0169717 A1 | * | 7/2007 | Conger | A01K 1/031 119/419 |
| 2007/0193527 A1 | * | 8/2007 | Verhage | A01K 1/031 119/418 |

(Continued)

*Primary Examiner* — Brady W Frazier
*Assistant Examiner* — Zoe Tam Tran
(74) *Attorney, Agent, or Firm* — Manuel de la Cerra

(57) ABSTRACT

Provided herein are animal containment cage bases and covers that can be nested to disengage and/or collapse one or more cage components or one or more cage component mount members from a cage base or cage cover. Also provided herein are methods of removing cage components or cage component mount members from cage bases and cage covers by nesting. Also provided herein, is a detachable animal containment cage component grommet and methods of use thereof.

16 Claims, 18 Drawing Sheets

(56) References Cited

U.S. PATENT DOCUMENTS

| | | | | |
|---|---|---|---|---|
| 2010/0218729 A1* | 9/2010 | Wang | ............ | A01K 1/031 |
| | | | | 119/421 |
| 2010/0326365 A1* | 12/2010 | Hallock | ............ | A01K 1/031 |
| | | | | 119/475 |
| 2011/0132272 A1* | 6/2011 | Gabriel | ............ | A01K 1/031 |
| | | | | 119/475 |
| 2012/0174870 A1* | 7/2012 | Grabois | ............ | A01K 63/003 |
| | | | | 119/253 |
| 2012/0272919 A1* | 11/2012 | McClelland | ............ | A22B 3/005 |
| | | | | 119/420 |

\* cited by examiner

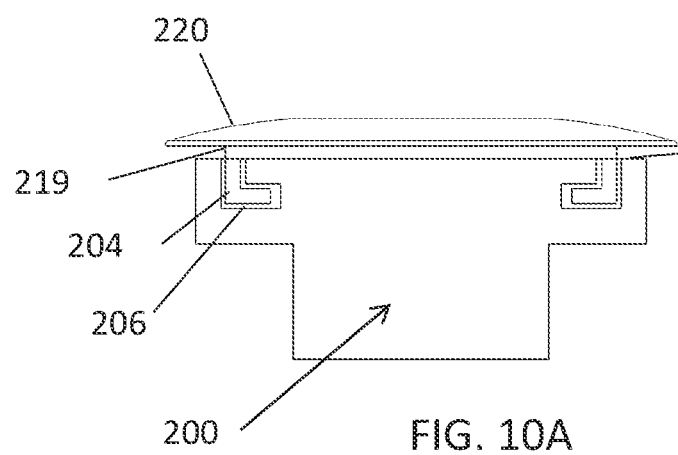
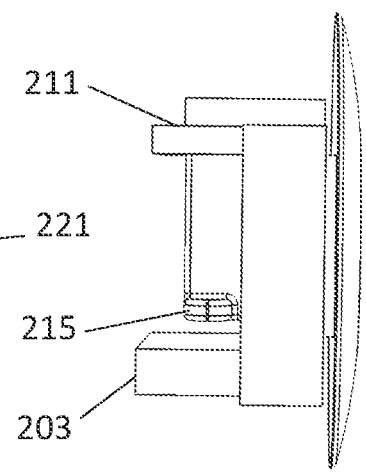
FIG. 10A
FIG. 10B
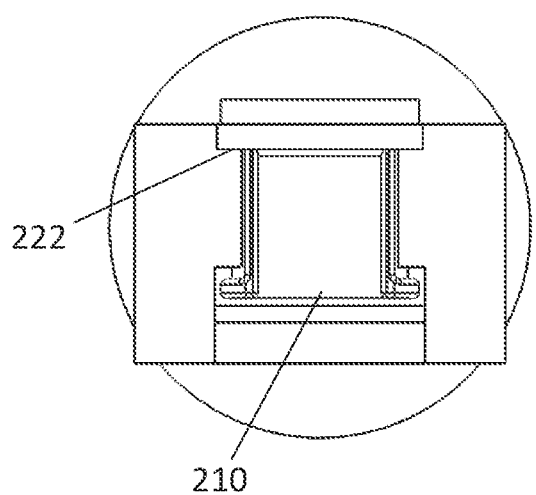
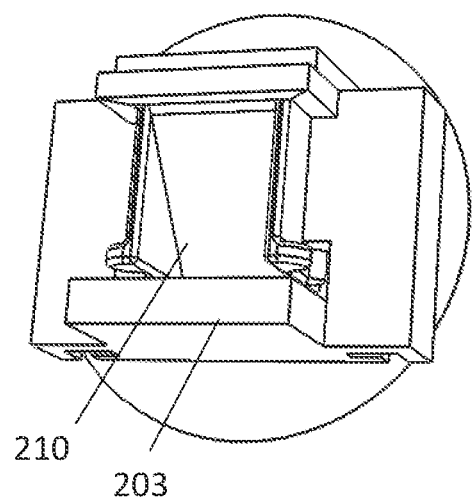
FIG. 10C
FIG. 10D

NESTABLE ANIMAL CONTAINMENT CAGE BASES AND COVERS AND NESTING PROCESSES

RELATED PATENT APPLICATION(S)

This patent application is a 35 U.S.C. 371 national phase patent application of PCT/US2019/037214 filed on Jun. 14, 2019, entitled NESTABLE ANIMAL CONTAINMENT CAGE BASES AND COVERS AND NESTING PROCESSES, naming Francesca McGuffie, Dee L. Conger and Daniel Romane, as inventors, which claims the benefit of U.S. Provisional Patent Application No. 62/686,583 filed Jun. 18, 2018, entitled NESTABLE ANIMAL CONTAINMENT CAGE BASES AND COVERS AND NESTING PROCESSES, naming Francesca McGuffie, Dee L. Conger and Daniel Romane as inventors. The entire contents of the foregoing patent application is incorporated herein by reference, including all text, tables and drawings.

FIELD

The technology relates in part to the field of animal husbandry and to animal containment.

BACKGROUND

Single-use animal containment cage bases, cage covers and other cage components are typically disposed of or recycled after use. Often animal containment cage bases, cage covers and other cage components that have been used are nested to facilitate storage and transport.

SUMMARY

Provided herein are compositions and methods based on nesting of cage bases and cage covers that facilitate processing of used cages and cage components for disposal or recycling.

Provided in certain aspects is an animal containment cage base with a bottom and one or more walls, wherein the walls comprise an interior surface and an exterior surface. The cage base is configured for nesting with another cage base. One or more cage components and/or one or more cage component mount members are engaged with a portion of the cage base. The cage components and the cage component mount members are configured for disengagement from the cage base when the cage base is nested.

Also provided in certain aspects is a set of animal containment cage bases that includes a first cage base comprising a bottom and one or more walls, wherein the walls comprise an interior surface and an exterior surface. A second cage base comprising a bottom and one or more walls. The first cage base is configured for nesting with the second cage base and the second cage base is configured for nesting with the first cage base. One or more cage components and/or one or more cage component mount members are engaged with a portion of the first cage base. The cage components and the cage component mount members are configured for disengagement from the first cage base when the first cage base and the second cage base are nested.

Also provided in certain aspects is a method for disengaging one or more cage components and/or cage component mount members from an animal containment cage base by nesting a first cage base comprising a bottom and one or more walls and one or more cage components and/or one or more cage component mount members with a second cage base comprising a bottom and one or more walls, whereby the one or more cage components and/or one or more cage component mount members are disengaged from the first cage base.

Also provided in certain aspects is an animal containment cage cover that includes a planar region comprising an interior surface and an exterior surface, and a flange region extending around a perimeter of the cover. The cage cover is configured for nesting with another cage cover. One or more cage components and/or one or more cage component mount members are engaged with a portion of the planar region of a cage cover. The cage components and the cage component mount members are configured for disengagement from the cage cover when cage cover is nested.

Also provided in certain aspects is a set of animal containment cage covers that includes a first cage cover comprising a planar region comprising an interior surface and an exterior surface and a flange region extending around a perimeter of the first cage cover. A second cage cover comprising a planar region comprising an interior surface and an exterior surface, and a flange region extending around a perimeter of the cover. The first cage cover is configured for nesting with the second cage cover and the second cage cover is configured for nesting with the first cage cover. One or more cage components and/or one or more cage component mount members are engaged with a portion of the first cage cover. The cage components and the cage component mount members are configured for disengagement from the first cage cover when the first cage cover and the second cage cover are nested.

Also provided in certain aspects is a method for disengaging one or more cage components and/or cage component mount members from an animal containment cage cover by nesting a first cage cover comprising a planar region comprising an interior surface and an exterior surface, a flange region extending around a perimeter of the cover, and one or more cage components and/or one or more cage component mount members engaged with a portion of the first cage cover with a second cage cover comprising a planar region comprising an interior surface and an exterior surface, and a flange region extending around a perimeter of the cover, whereby the one or more cage components and/or one or more cage component mount members are disengaged from the first cage cover.

Also provided in certain aspects is a detachable animal containment cage component grommet that includes an interior member comprising an aperture for insertion of a cage component; and an exterior member comprising a sliding door to allow access to the aperture; wherein the interior member and the exterior member are configured for engagement and for disengagement.

Also provided in certain aspects is a method of detaching an animal containment cage component grommet from an animal containment cage by nesting a first cage base comprising an animal containment cage component grommet with a second cage base comprising a bottom and one or more walls, whereby the animal containment cage component grommet is detached from the first cage base.

Also provided in certain aspects is a rodent containment cage component grommet with an interior member comprising an aperture for insertion of a water supply tube and a male sliding member and an exterior member comprising a sliding door for access to the aperture; a female sliding member and an extension member. The male sliding member is configured to engage the female sliding member to associate the interior member and the exterior member and produce an assembled grommet. The assembled grommet is attached to a cage base wall when the interior member is inserted from the interior of a cage base through an opening in a cage base wall to contact the exterior member positioned exterior to the cage base to engage the male and female sliding members. The assembled grommet when attached to a cage base wall is disassembled and detached from the cage base wall when the cage base is nested with another cage base and a wall of the other cage base contacts the extension member.

Certain embodiments are described further in the following description, examples, claims and drawings.

BRIEF DESCRIPTION OF THE DRAWINGS

The drawings illustrate certain embodiments of the technology and are not limiting. For clarity and ease of illustration, the drawings are not made to scale and, in some instances, various aspects may be shown exaggerated or enlarged to facilitate an understanding of particular embodiments.

FIG. 10A shows a bottom view of a detachable animal containment cage component grommet.

FIG. 10B shows a side view of a detachable animal containment cage component grommet.

FIG. 10C shows a rear view of a detachable animal containment cage component grommet.

FIG. 10D shows bottom front isometric view of a detachable animal containment cage component grommet.

Figure 1:
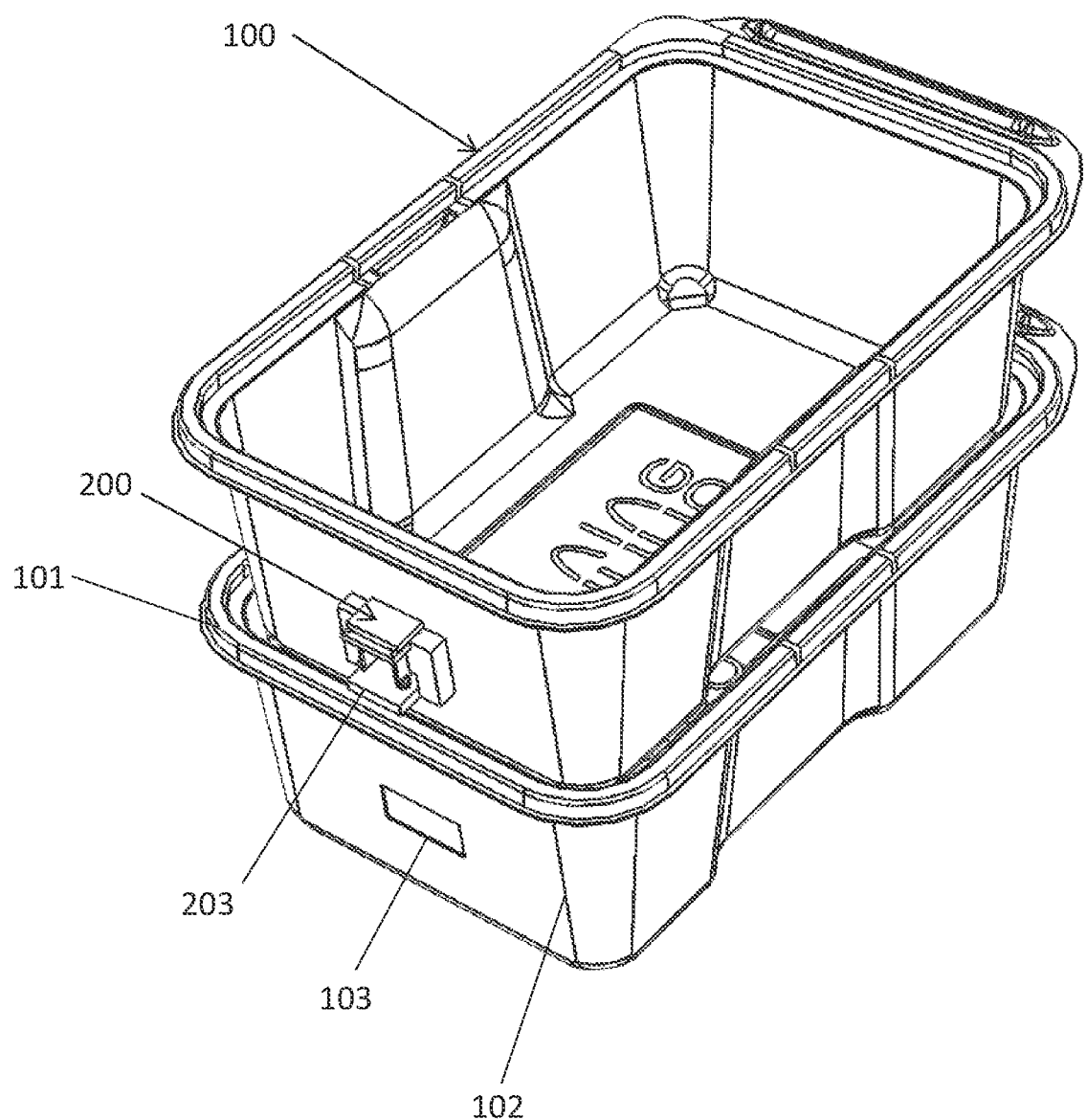
FIG. 1 shows a rear isometric view of nesting of a cage base including a detachable animal containment cage component grommet with another cage base.

Certain features in the drawings are summarized in Table 1.

TABLE 1

| Callout | Feature |
|---|---|
| 100 | cage base |
| 101 | top surface |
| 102 | rear wall |
| 103 | mount opening |
| 104 | bottom of upper cage base |
| 200 | assembled grommet |
| 201 | exterior member |
| 202 | interior member |
| 203 | extension member |
| 204 | male sliding member |
| 205 | water supply tube aperture |
| 206 | female sliding member |
| 207 | sloped surface |
| 208 | sliding stand |
| 209 | door |
| 210 | sloped wall |
| 211 | door retainer |
| 215 | bottom door stop |
| 216 | door rail |
| 217 | top door stop |
| 218 | door guide |
| 219 | cage wall void |
| 220 | 1st interior member radius |
| 221 | retaining surface |
| 222 | connection member |
| 223 | sliding member stop |
| 224 | 2nd interior member radius |
| 300 | water supply tube |
| 400 | cage lid |
| 401 | Upper cage cover bottle cavity |
| 500 | water pouch |
| 600 | collapsible feeder |
| 601 | breakable tabs |
| 602 | collapsed feeder w/tabs broken off |
| 700 | collapsible enrichment wheel |
| 701 | collapsed enrichment wheel |

DETAILED DESCRIPTION

Provided herein are animal containment cage bases that can be nested, that have cage component members and cage component mounting members that can be disengaged when the cage bases are nested. Also provided herein are animal containment cage covers that can be nested, that have cage component members and cage component mounting members that can be disengaged when the cage covers are nested.

Some or all of the disengaged cage component members and cage component mounting members, although detached remain associated with nested cage bases or nested cage covers. In addition, detached but associated cage component members and cage component mounting members often have a flat profile or are flattened in the nesting process. Also, cage bases, cage covers, cage component members and cage component mounting members can be constructed from the same recyclable material. Use of the cage bases, cage covers, cage component members and cage component mount members described herein can provide many advantages, including, but not limited to the following. Less labor intensive, repetitive and time-consuming user manipulations: (i) cage component members and cage component mount members need not be individually detached from cage bases and covers prior to nesting (they are detached by nesting) and (ii) disengaged cage component members and cage component mounting members need not be separated from cage bases or cage covers prior to recycling as they are all the same material. A higher nesting density of materials can be achieved as certain flat or flattened cage component members and/or cage component mount members are associated with nested cage bases or cage covers without significantly interfering with the degree of nesting of cage bases or cage covers. Use of the described cage bases and cage covers that can be nested along with the described methods results in a compact assembly of cage bases or cage covers along with certain cage components that can be recycled without further preparation.

Animal containment cage units often comprise a cage unit base member, a cover member, and one or more additional component members associated with a cage base and/or a cage cover. An animal cage base sometimes is provided separately from a cover, the cover often can be sealingly attached to the cage base and the cover often is readily detachable from the base. A variety of animals can be contained within cages described herein. Rodents often are contained within such units, including but not limited to mice, rats, hamsters, gerbils, guinea pigs, chinchillas and rabbits.

Cage Bases

A cage base is of any geometry suitable for housing animals, such as cylindrical, substantially cylindrical, conical, rectangular, square, cubic, rhomboid and the like, for example. A cage base often comprises a bottom member that supports a plurality of sidewall members (e.g., four sidewall members). One sidewall member often is referred to as the "front sidewall member" and the opposite sidewall member often is referred to as the "rear sidewall member." Opposing sidewall members sometimes are parallel, substantially parallel, not parallel, rhomboid, substantially rhomboid or a combination thereof. In some embodiments, opposing sidewalls are not parallel, and are not vertical with respect to the bottom. In such embodiments, a sidewall, and sometimes all sidewalls, are at a non-90 degree angle with respect to the bottom, such as an angle between about 91 degrees and about 105 degrees, an angle of about 92 degrees to about 98 degrees or an angle of about 95 degrees, for example. Such angled sidewall configurations (with respect to the bottom) can promote cage base nesting The top edge of one or more sidewall members often is contiguous with a flange portion that extends, often vertically, from the outer surface of the sidewall member. The flange sometimes forms a continuous surface around the top perimeter of the cage and its surface often is horizontal when the cage rests on its bottom member. The flange sometimes is configured to mate with a portion of a cover member, described further herein. In some embodiments, the flange includes an optional downward extending lip member, which sometimes mates with a corresponding member of a cover to form a detachable seal. The profile of the lip member of the base is of any shape to allow a fit with a corresponding structure on the cover, where the profile sometimes is curved, and sometimes is S-shaped, V-shaped or J-shaped.

Sidewall members and bottom member are typically constructed from a polymer and can have a thickness of about 0.01 inches to about 0.08 inches or the thickness of about 0.01 inches to about 0.03 inches. The sidewalls often are of substantially uniform thickness. The bottom often is of substantially uniform thickness.

Cage Covers

A cover often is provided separately from a cage base, often reversibly mates with a cage base, sometimes in sealing attachment, and is of any suitable geometry allowing for attachment to the base. A cover member often comprises a substantially planar region and a flange region. The substantially planar region often comprises one or more cage components described herein. In some embodiments, a cage cover can include an integral structure, such as a holder for a water receptacle or a water bottle cavity. The flange region sometimes is embossed, can be raised, often comprises a region that extends downwards as a lip (referred to herein as a "lip"). A flange and optional lip region may extend continuously around the perimeter of the cover. The profile of the flange and optional lip often correspond to a flange and optional lip on a cage base, and often allow the cover to seal with the base via an interference fit. The flange and optional lip are of any shape to effect an interference fit with the base, and sometimes are S-shaped, V-shaped, J-shaped and U-shaped, upwards or inverted, for example. Examples of materials from which the cover can be constructed include those described above for cage bases. Sometimes the cover and base are constructed from the same material and sometimes are of a similar or the same thickness.

Nested Cage Bases and Covers

A cage base can be inserted into another cage base and several cage bases can be stacked or a cage cover can be inserted into another cage cover and several cage covers can be stacked, which is referred to herein as "nesting." Nesting cage components significantly reduces the volume of multiple cage bases or cage covers as compared to the same number of un-nested members, which is advantageous for storage and shipping of used cage bases or cage covers to a facility for disposal or recycling, for example. Any convenient number of like members can be nested, including, but not limited to, 10 or more, 20 or more, 30 or more, 40 or more, 50 or more, 60 or more, 70 or more, 80 or more, 90 or more or 100 or more like members. The degree or efficiency of nesting sometimes can be expressed in terms of a percentage, which is the height or volume of the nested member within another like member containing it, relative to the overall height or volume of the nested member. Thus, the term "80% nested" indicates 80% of the volume or height of a nested cage member, for example, is contained within the member in which it is inserted. When stacked, cage bases provided herein often are about 75% or more nested, sometimes about 80% or more or about 85% or more nested, and sometimes about 90% to about 95% nested. When stacked, cage covers provided herein often are about 70% or more nested, sometimes about 75% or more, sometimes about 80% or more or about 85% or more nested, and sometimes about 90% to about 95% nested.

Thus, in certain embodiments provided are cage bases that can be nested. In certain embodiments provided are cage covers that can be nested.

As used herein, "nesting" is inserting a first cage base (i.e., upper base), having at least one engaged cage component or cage mount member to be disengaged, into the interior of a second cage base (i.e., lower base) (the second cage base can be alone or part of a stack of nested cage bases) or inserting a second cage base (i.e., upper base) into the interior of a first cage base (i.e., lower base) having at least one engaged cage component or cage mount member to be disengaged (the first cage base can be alone or part of a stack of nested cage bases).

Also as used herein, "nesting" is inserting a first cage cover (i.e., upper cover), having at least one engaged cage component or cage mount member to be disengaged, into a second cage cover (i.e lower cage cover, the exterior surface of the second cage cover is contacted by the interior surface of the first cage cover) (the second cage cover can be alone or part of a stack of nested cage covers) or inserting a second cage cover (i.e., upper cover) into a first cage cover having at least one engaged cage component or cage mount member to be disengaged (i.e lower cage cover, the exterior surface of the first cage cover is contacted by the interior surface of the second cage cover) (the first cage base can be alone or part of a stack of nested cage bases).

Cage Component Members

Typically cage components are separate from a cage base or cage cover and are reversibly engaged a cage base or a portion thereof or a cage cover or a portion thereof. In some embodiments, may be integral to a cage base or cage cover, but are not permanently integrated.

Examples of cage components or cage component members in addition to a cage base and cage cover can include, but are not limited a feed supply component (often referred to herein as a "feeder," "food trough," or "food tray") a water supply component (e.g. water bottle, water pouch), a water supply holder or water supply receptacle (e.g. a bottle holder or mesh pouch holder), a card holder, a shelter (e.g., a dome), an exercise component (e.g., a wheel), an enrichment component and combinations thereof (e.g., combination wheel and dome).

A shelter structure is of any shape or geometry that allows an animal to enter the structure and become covered or partially covered by the structure. Any convenient structure for housing animals can be used, and in some embodiments, a shelter is a perforated pipe structure. An example of a combined feeding and shelter structure is described in U.S. Pat. No. 6,571,738.

Cage components (e.g., a water supply tube or a sensor) that are removed from a cage base or a cage lid prior to nesting are not included in the above discussed components.

A cage component member can be constructed of any material suitable for containing an animal using materials and manufacturing process such as those described for manufacturing cage bases and cage covers, for example. In some embodiments a cage component is constructed from the same polymer material that can be recycled (e.g., PET) as are cage bases and cage covers. This eliminate the need to sort disengaged cage components from nested cage bases or nested cage covers prior to recycling.

Cage Component Mount Member

A cage component mount member can be used to engage or attach a cage component member with a cage base or a cage cover. In some embodiments, a cage component mount member can engage a cage component with a cage base wall interior or exterior surface or a cage cover interior or exterior surface. In some embodiments, a cage component mount member can be used to insert a cage component through a cage base wall or through a cage cover so that a cage component can access an interior region of a cage.

A cage component mount member can be a part of a cage component (e.g., a flange of a cage component such as a flange member surrounding the top edge of the food tray) or an attachment to a cage component. A cage component mount member can be any suitable shape or size that enables a cage component to be engaged with a cage base or cage cover so as to be able to carry out its intended function.

In some embodiments, a cage component mount member rests on or is positioned by one or more mounts or cradles extending from an inner surface of one or more sidewall members of a cage base which allows for attachment of a cage component (e.g., a card holder) to the inside surface of a sidewall of a cage base. In some embodiments, a cage component mount member rests on or is positioned by one or more mounts or cradles extending from an outer surface of one or more sidewall members of a cage base which allows for attachment of a cage component (e.g., a card holder) to the outside surface of a sidewall of a cage base. In some embodiments, a cage mount is a substantially flat, planar member, where the surface of the cage mount is parallel or essentially parallel to the surface of the cage base bottom.

A cage base sometimes comprises one or more indents in a sidewall member that extends towards the interior of the cage base. An indent sometimes is configured to orient one or more cage components (e.g., feeding tray), and sometimes it or a portion thereof is referred to as a "cradle" or "support member" when utilized in this manner. A support is of any geometry useful for supporting and orienting a cage component, and sometimes is an extension comprising a planar upper surface parallel with a base unit bottom surface. A cage base sometimes comprises one or more detents in a sidewall member that extend away from the interior of the cage base and are of a shape adapted to receive a cage component mount member or portion thereof.

In certain embodiments, a cage cover comprises an aperture through which a cage component mount member or a cage component is fixed and/or suspended. In some embodiments a cage cover comprises a holder or receptacle for a cage component.

A cage component mount member can engage a cage component with a wall of a cage base or a surface of a cage cover by any manner that can be disrupted by the nesting of cage bases or cage covers so that the cage component associated with the cage component mount member is disengaged from a cage base or cage cover. For example engagement can be, but is not limited to, hanging, suspending, resting upon, reversible association by sliding engagement with a corresponding feature, reversibly sealing or inserting into an aperture. In some embodiments a cage component or a cage component mount member can be dislodged by nesting of cage bases or cage covers. In some embodiments a cage component mount member can be broken apart or sheared off a cage component it is attached to by the nesting of cage bases or cage covers, disengaging or releasing a cage component from a cage base or cage cover. In some embodiments, a cage component mount member can be formed as a beak away part. In some embodiments, a cage component mount member that is reversibly sealed or affixed or attached to a cage base or cage cover can be separated from a cage base or a cage cover by nesting of cage bases or cage covers. In some embodiments, a cage component mount member can be disassembled into two or more component parts by nesting of bases or covers, thereby disengaging or releasing a cage component and/or the cage component mount member from a cage base or cage cover.

In some embodiments, a cage component mount member can be constructed from known materials that will maintain their structural integrity when exposed to conditions created by standard use of an animal containment cage, but will not maintain their integrity under conditions resulting from nesting. In some embodiments, cage component mount members can be sealed or affixed using from known materials that will function to seal or adhere when exposed to conditions created by typical use of an animal containment cage, but will not function to seal or adhere under conditions resulting from nesting. In some embodiments a cage component mount member can be constructed to have one or more weak sections (e.g., of less thickness than the remainder of the cage component mount member) that are compromised only under nesting conditions. In some embodiments a cage component mount member can be made of the same material as a cage base or a cage cover and is constructed to have one or more weak sections.

Figure 11A:
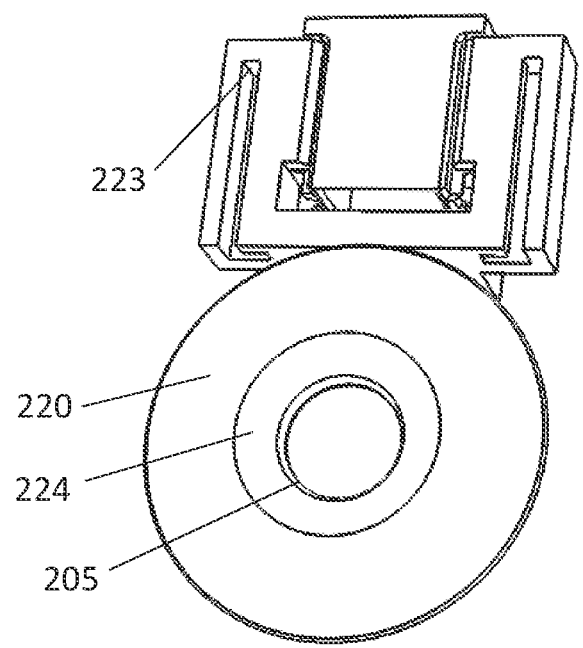
FIG. 11A shows a front isometric view of a disassembled detachable animal containment cage component grommet.
Figure 11B:
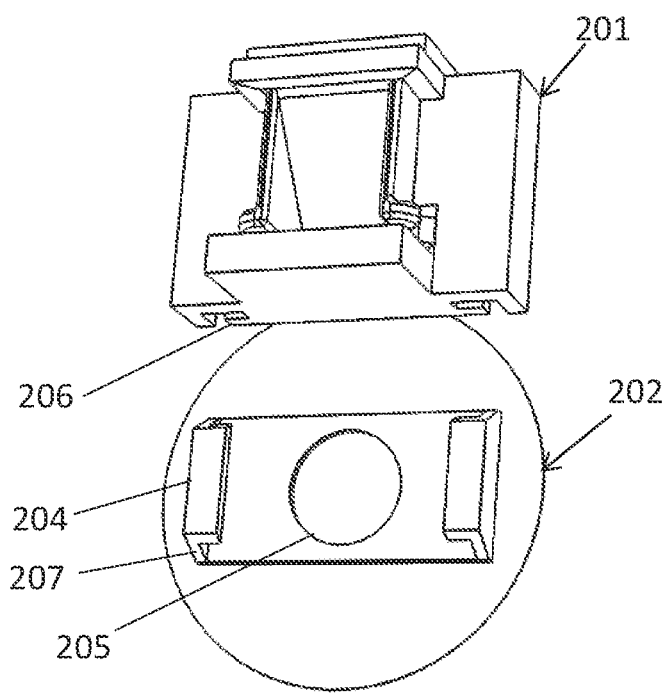
FIG. 11B shows a rear isometric of a disassembled detachable animal containment cage component grommet.
Figure 12A:
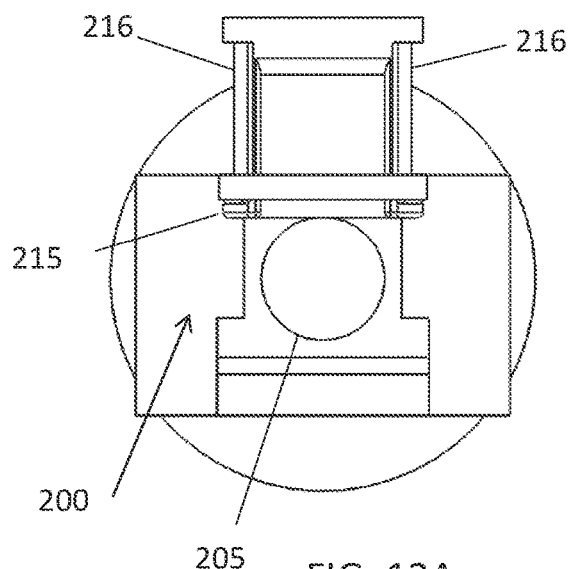
FIG. 12A shows a rear view of a detachable animal containment cage component grommet with a door in an open position.
Figure 12B:
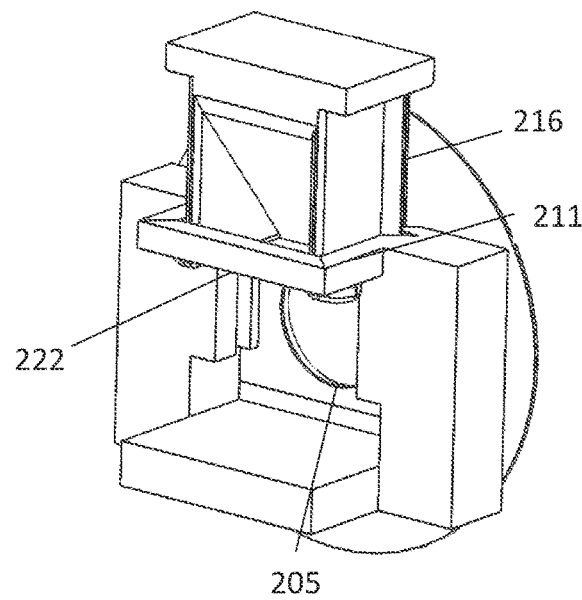
FIG. 12B shows a rear isometric view of a detachable animal containment cage component grommet with a door in an open position.
Figure 12C:
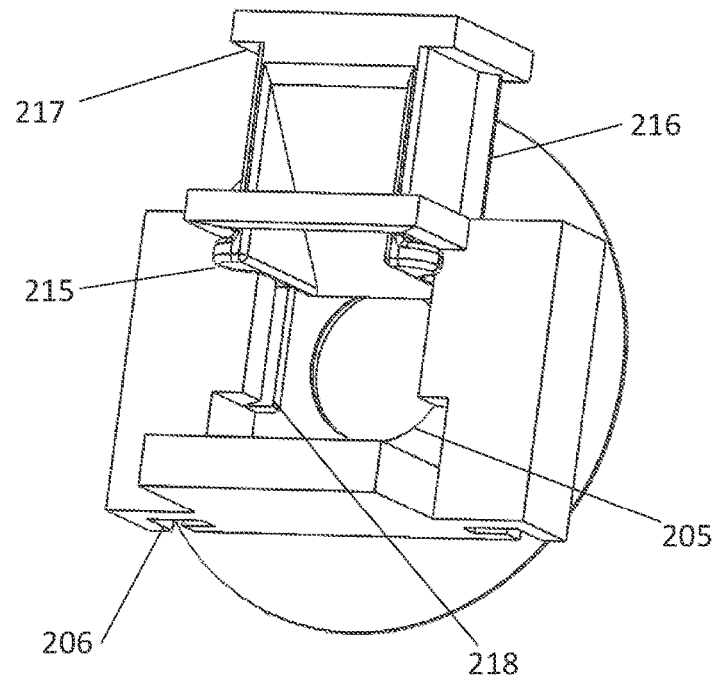
FIG. 12C shows a bottom rear isometric view of a detachable animal containment cage component grommet with a door in an open position.

In some embodiments, a cage component (e.g., a water supply tube) is removed from a cage component mount member prior to nesting, and it is the cage component mount member without a cage component that is disengaged from a cage base or a cage cover by nesting. A non-limiting example of such a cage component mount member is a detachable animal containment cage component grommet (hereinafter "grommet") (e.g., 200 illustrated in FIGS. 5-12). An assembled grommet (200) can include an interior member (e.g., 202 in FIGS. 4 and 11B) and an exterior member (e.g., 201 in FIGS. 3, 4 and 11B).

An interior member (202) can be inserted from the interior of a cage base into and through a mount opening (e.g., 103 in FIG. 1) in a cage base rear wall (e.g., 102 in FIG. 1). An interior member sometimes can be disk shaped (e.g., 201 in FIGS. 11A and 11B) and can have two sides. When an interior member is inserted into and through a mount opening of a cage base wall, one side can face the interior of the cage base and can be essentially flat. The flat side can have a first interior member radius (e.g. 220 in FIGS. 10A and 11A), a second interior member radius (e.g., 224 in FIG. 11A) and an aperture (e.g. 205 in FIG. 11A). The other side, in part, can contact an inner surface of a cage base wall and in part, can be rectangular shaped and occupy the mount opening (see FIG. 4). The other side of an interior member can include an aperture (e.g., 205 in FIG. 11B) and a male sliding member on each short side of the rectangle (e.g., 204 in FIGS. 4 and 11B), each of which can protrude out into the exterior of a cage base. A male sliding member can have a sloped surface (e.g., 207 in FIGS. 4 and 11B) that facilitates assembly and disassembly of an interior member and an exterior member.

Figure 4:
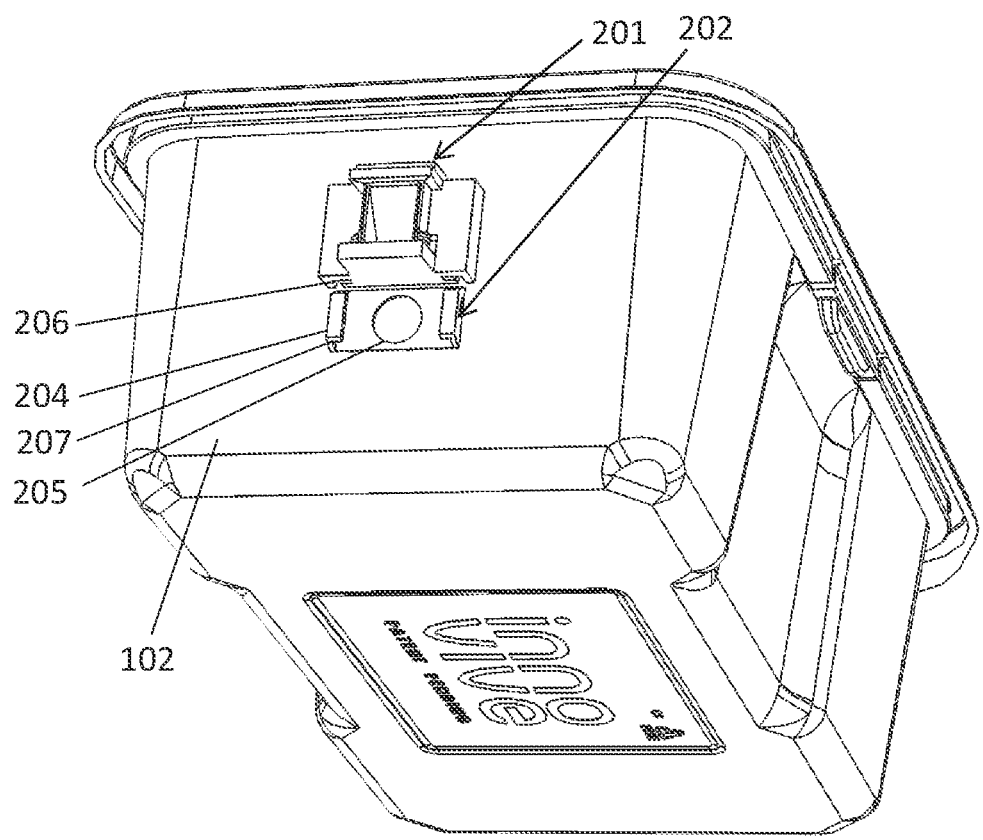
FIG. 4 shows a bottom rear isometric view of attachment of a detachable animal containment cage component grommet to a cage base wall.
Figure 5:
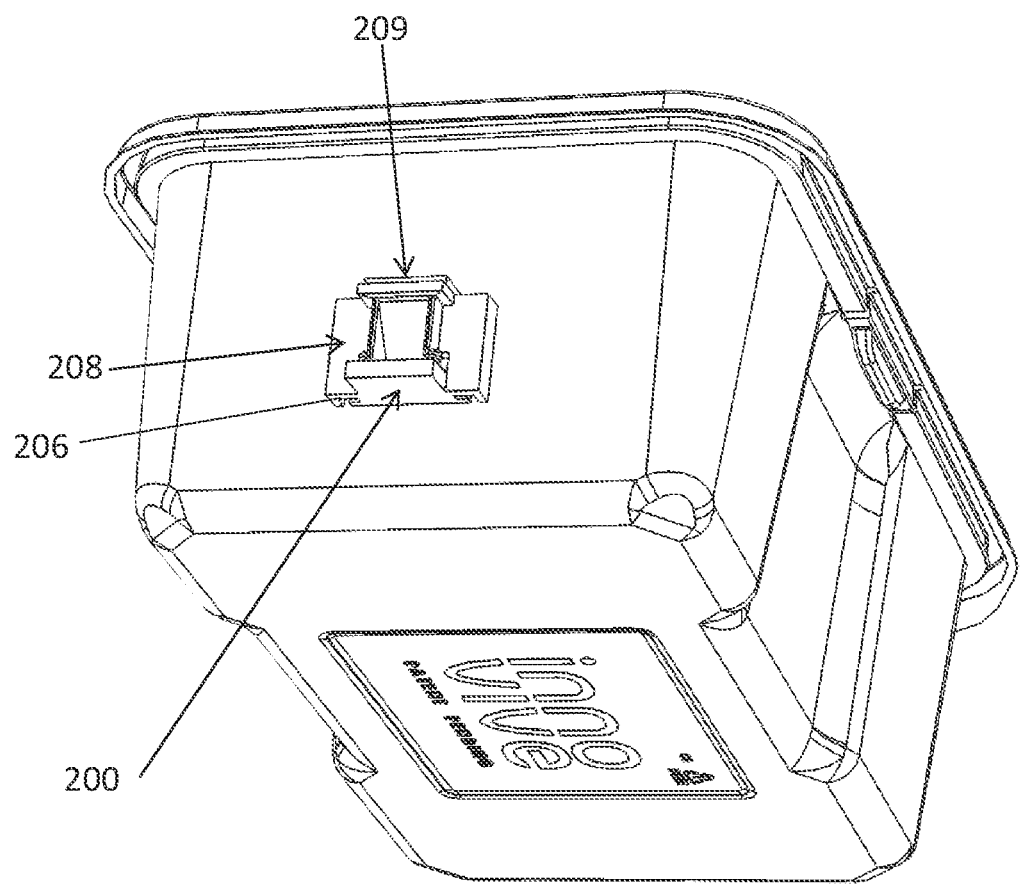
FIG. 5 shows a bottom rear isometric view of completed attachment of a detachable animal containment cage component grommet to a cage base wall.

An exterior member (201) is located in the exterior of a cage base wall (see FIG. 4). An exterior member can have a sliding stand (e.g., 208 in FIGS. 5, 6, 7 and 8) that can be rectangular in shape and can include a female sliding member on each short side (e.g., 206 in FIGS. 4, 5, 11B and 12C). A exterior member can be oriented so a female sliding member (206) can slidingly engage the male sliding member (204) it is aligned with (see FIGS. 4, 10A and 11B) until the male sliding member contacts a sliding member stop (e.g., 223 in FIG. 11A), thus engaging the exterior member and the interior member and attaching the grommet to a cage base wall (see FIG. 5).

An exterior member can include a retaining surface (e.g., 221 in FIG. 10A), that prevents the grommet from falling into a cage. An exterior member can include an extension member (e.g., 203 in FIGS. 2, 10B and 10D).

An exterior member can also include a door (e.g., 209 in FIGS. 5, 6 and 7) that can move relative to a sliding stand (208). A door can have door rails (e.g., 216 in FIGS. 7 and 12A-C) that can slide on door guides (e.g., 218 in FIGS. 9 and 12C). A door can have a sloped surface (e.g., 210 in FIGS. 6, 7, 8, 10C and 10D). A door can have a door retainer that prevents the door from opening too much (e.g., 211 in FIGS. 6, 7, 8, 9, 10B and 12B), a bottom door stop (e.g., 215 in FIGS. 7, 8, 9, 10B, 12A and 12C), a top door stop (e.g., 217 in FIGS. 8, 9 and 12C) and a connection member that reinforces door retainers (e.g., 222 in FIGS. 100 and 12B).

Figure 6:
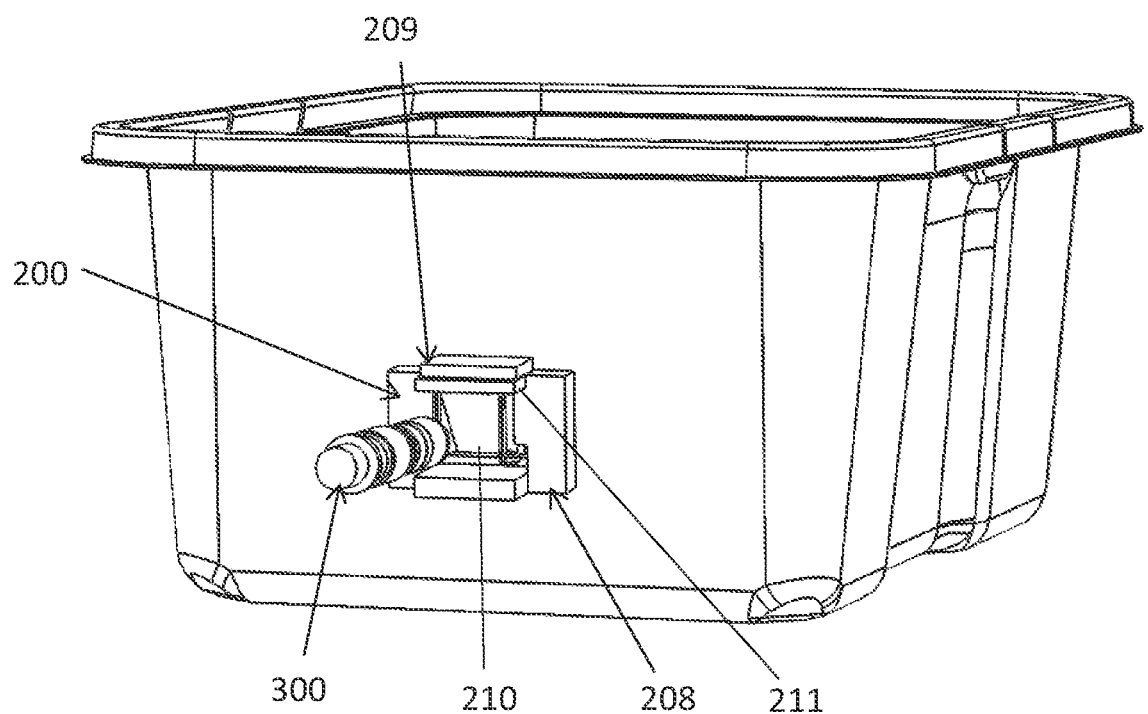
FIG. 6 shows a rear view of a water supply tube in positon to be inserted into a detachable animal containment cage component grommet.
Figure 7:
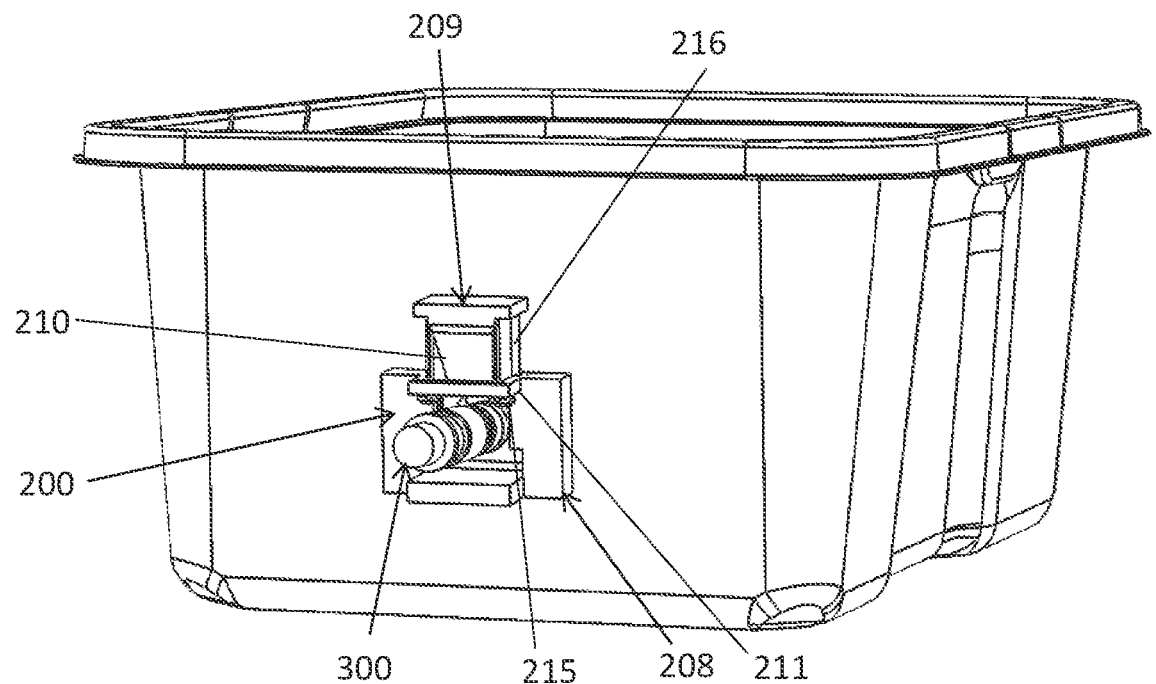
FIG. 7 shows a rear view of a water supply tube inserted into a detachable animal containment cage component grommet.
Figure 8:
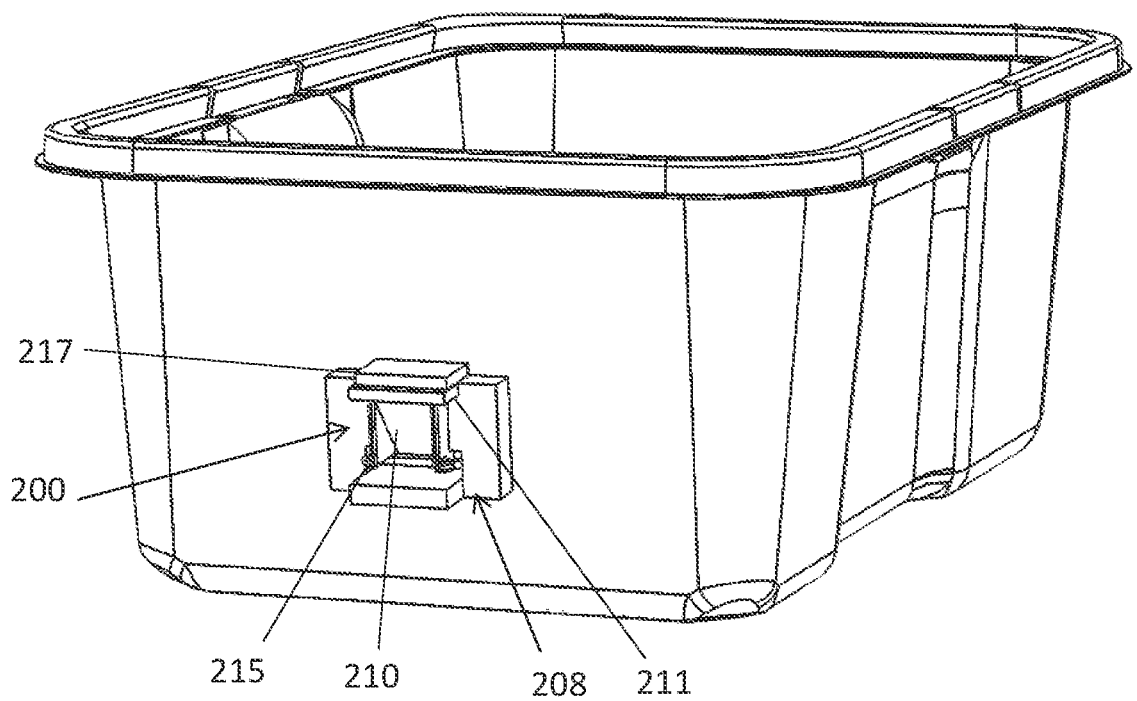
FIG. 8 shows a rear view of a detachable animal containment cage component grommet with a door in closed position.
Figure 9:
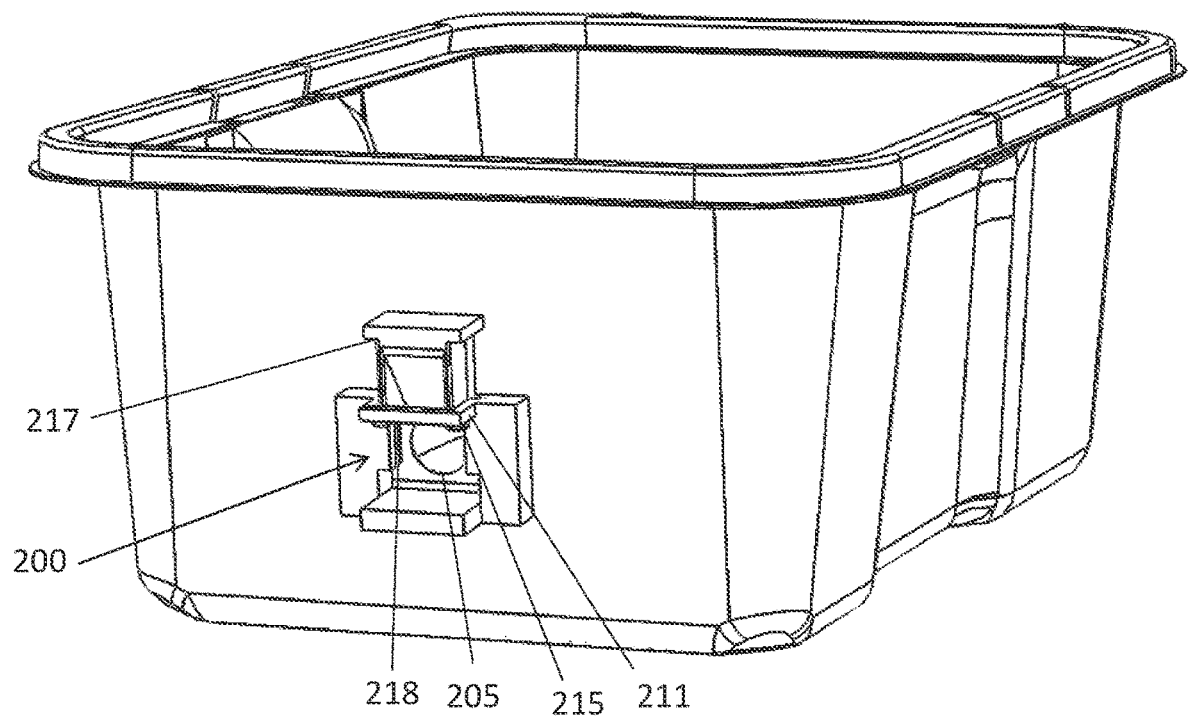
FIG. 9 shows a rear view of a detachable animal containment cage component grommet with a door in an open position.

Once a grommet is assembled as described above, a cage can be placed into a rack that has an automatic watering system installed. When a cage is pushed towards the water supply tube, which is fixed on a rack, the grommet engages with a water supply tube (e.g., 300 in FIGS. 6 and 7). The water supply tube contacts the angled surface (210) and the water supply tube automatically raises the door (209), since the door is at a 45 degree angle, exposing the aperture (205) that the water supply tube travels through to reach the interior of a cage, where an animal can access it. When a cage is removed from a rack, the water supply tube disengages from the grommet and the door automatically shuts due to gravity. FIG. 6 shows a door closed with water supply tube visible and not inserted into the grommet. FIG. 7 shows a door open due to water supply tube engagement. A door can be in a closed position covering aperture 205 (see FIGS. 5, 6 and 8) or an open position which exposes the aperture (see FIG. 9).

In some embodiments a detachable animal containment cage component grommet can be used for any cage component or item that need to be inserted in and removed from the interior of a cage (e.g., through a cage base wall). For example, a sensor. In some embodiments, the shape of an aperture of a grommet could vary in order to match the shape of the component to be inserted.

Disengagement

The act of nesting one cover to another cover or one base to another base can disengage or dislodge a cage component and/or a cage component mount member (e.g., a grommet). In certain embodiments, nesting results in a cage component becoming disengaged from a cage base or cage cover with or without a cage component mount member. In some embodiments, nesting comprises inserting a first cage base (i.e., upper base) having a cage component into the interior of a second cage base. The second cage base can be alone or part of a stack of nested cage bases. The cage component of a first cage base or a cage component mount member used to engage the cage component with the first cage base is contacted by a second cage base. Contact typically is by a top edge of a base wall or a flange member that forms the upper edge of a wall of the second cage base (i.e., lower base). The upward directed force generated by nesting and transmitted by the second cage can be sufficient to dislodge or move a cage component or a cage component mounting member. In some embodiments, a cage component or cage component mounting member or portion thereof is translated upward (slides upward and off of engagement track).

Figure 2:
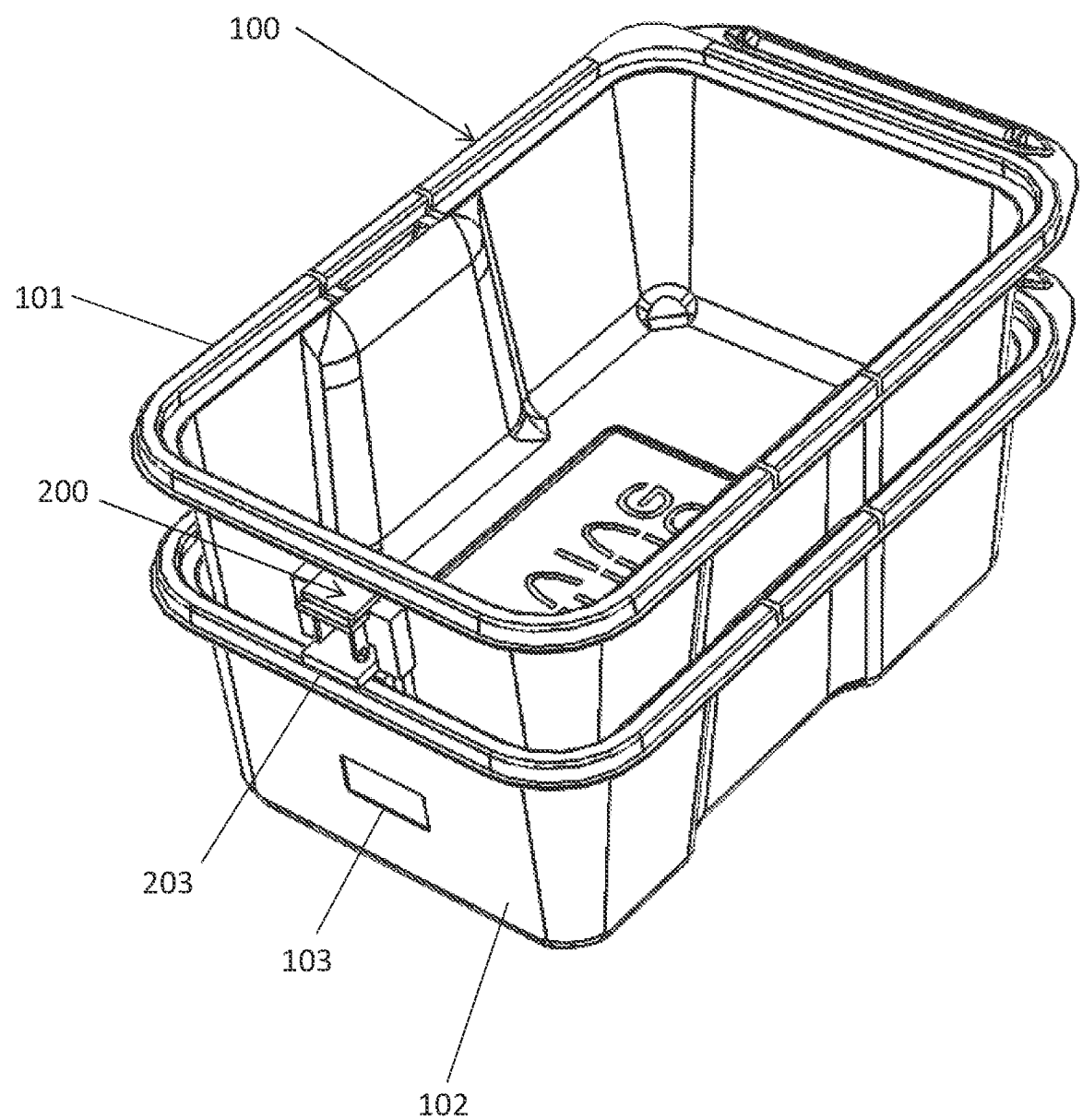
FIG. 2 shows a rear isometric view of progressed nesting of the cage bases initially shown in FIG. 1.
Figure 3:
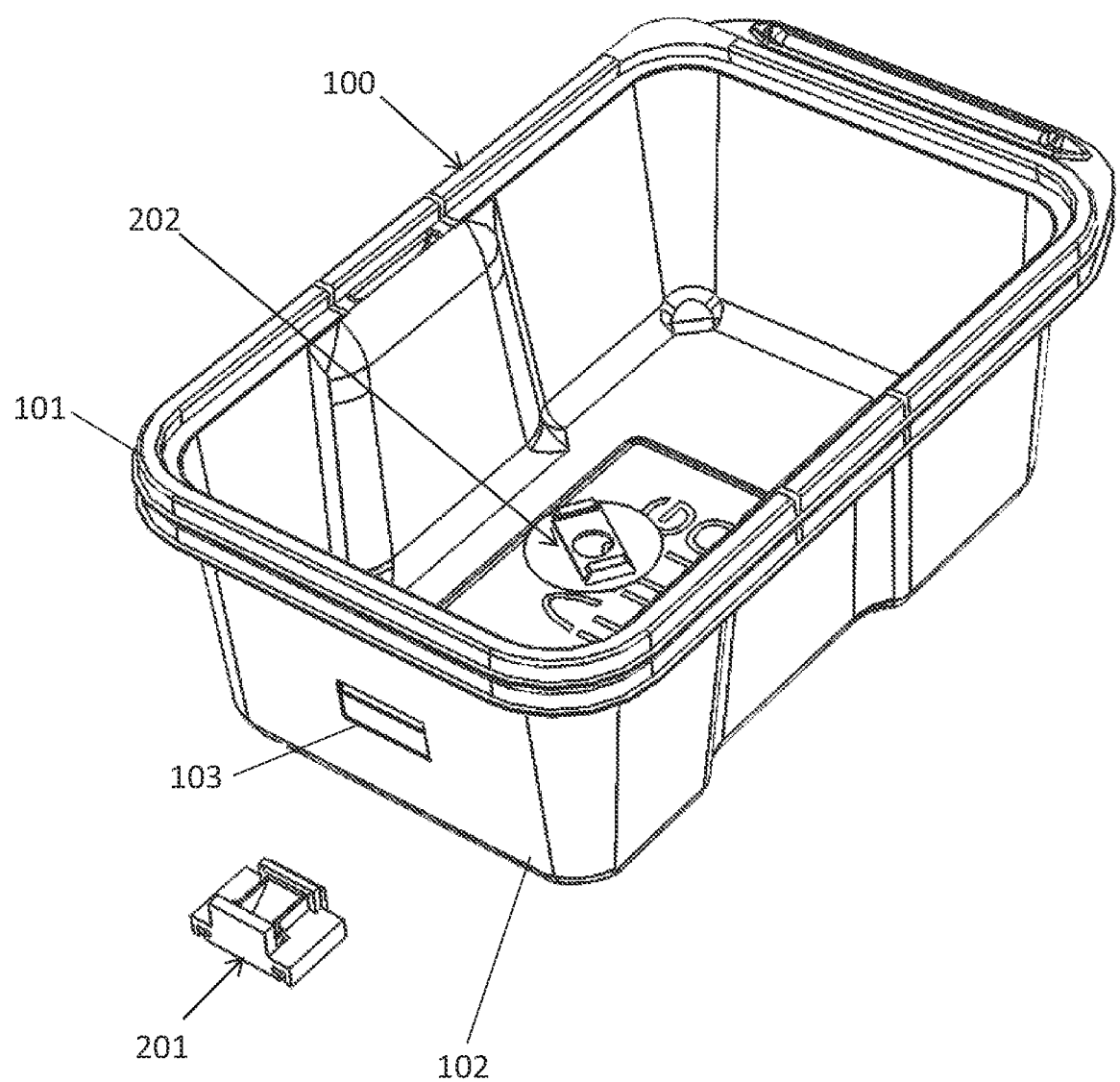
FIG. 3 shows a rear isometric view of completed nesting of the cage bases initially shown in FIG. 1.

A non-limiting embodiment of disengagement by nesting is shown in FIGS. 1 to 3. FIGS. 1 to 3 illustrate a progression of nesting of two cage bases (cage bases about to be nested, cage bases partially nested and grommet starting to disassemble, cage bases fully nested). In this embodiment, nesting of cage bases (e.g., 100 in FIGS. 1, 2 and 3) disassembles a grommet (e.g., 200 in FIGS. 1 and 2) thus detaches the grommet from a cage base wall. The bottom extension member of a grommet (e.g., 203 in FIGS. 1 and 2) contacts the top surface of the lower cage base (e.g., 101 in FIG. 1). This action can result in the female sliding members (206) attached to an exterior grommet member (201) sliding upward and off the male sliding members (204) attached to an interior grommet member (202). FIG. 3, shows complete nesting of the cage bases resulting in the grommet being disassembled and separated from a cage base. The interior member (202) falls into a cage base and is flat relative to the cage base bottom. The exterior member (201) falls external to the cage bases.

In some embodiments a cage component mounting member or portion thereof can be broken or sheared off by the nesting of cage bases or cage covers.

In some embodiments, nesting comprises inserting a second cage base (i.e., upper base) into the interior of a first cage base having an engaged cage component or cage mount member to be disengaged. This embodiment could result in downward directed force on a cage component or a cage component mount member that is transmitted by the bottom of a cage base.

Figure 16:
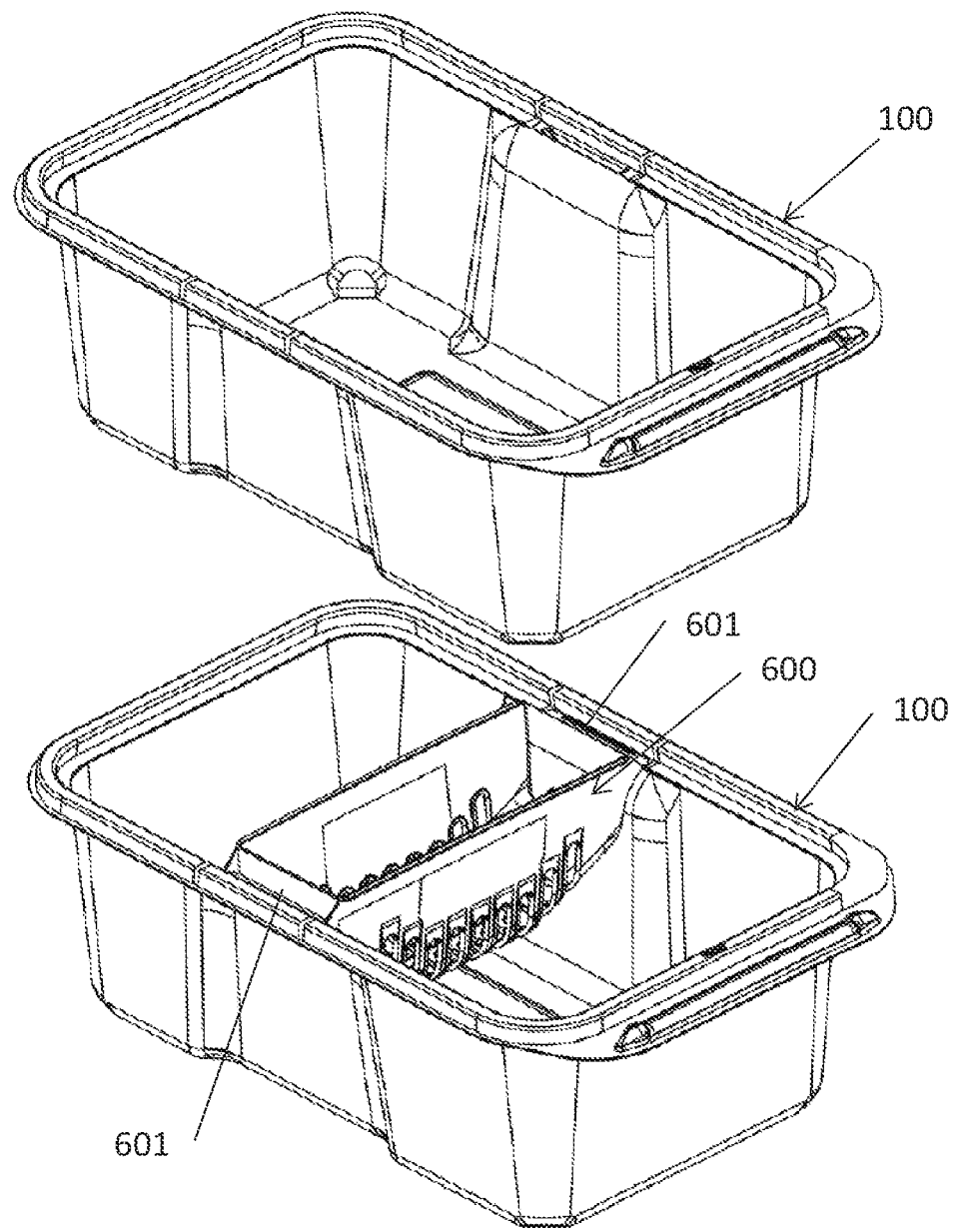
FIG. 16 shows an isometric view of nesting of a cage base including a collapsible feeder with another cage base.
Figure 17:
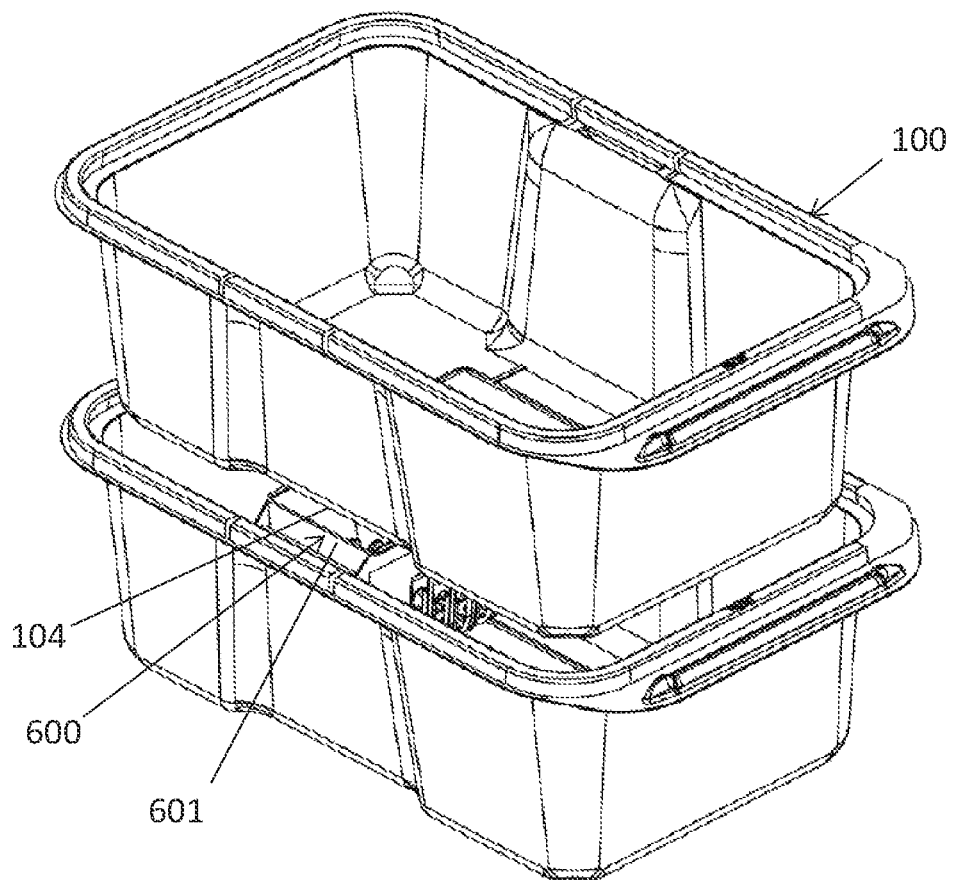
FIG. 17 shows an isometric view of progressed nesting of the cage bases initially shown in FIG. 16.
Figure 18:
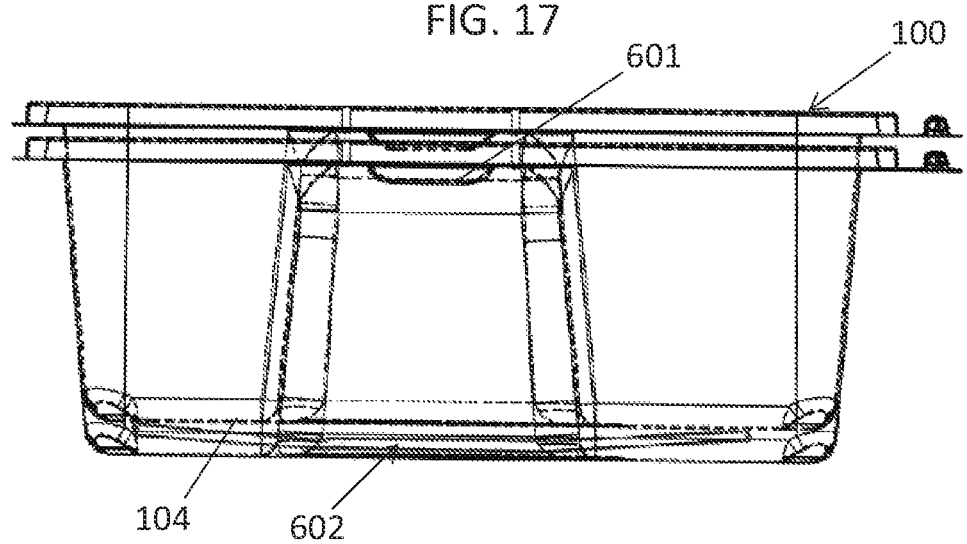
FIG. 18 shows a transparent side view of completed nesting of the cage bases initially shown in FIG. 16.

A non-limiting embodiment of disengagement by nesting that involves breakable tabs or cage component mount connectors is shown in FIGS. 16 to 18. FIGS. 16 to 18 illustrate a progression of nesting of two cage bases (cage bases about to be nested, cage bases partially nested and cage bases fully nested). In this embodiment, breakable tabs (e.g., 601 in FIGS. 16 and 17) are attached to sides of collapsible feeder (e.g., 600 in FIGS. 16 and 17) so that the feeder contacts inner walls of a cage base and is suspended in the cage base interior. In this embodiment, nesting of cage bases (e.g., 100 in FIGS. 16, 17 and 18) breaks off the breakable tabs, which thus detaches the feeder from the cage base walls. Nesting results in the bottom of the upper cage base (e.g., 104 in FIGS. 17 and 18) contacting the feeder in the lower cage base with sufficient downward directed force to result in the breakable tags being broken off the feeder. The disengaged feeder remains in the interior of the lower cage base. Further nesting of the cage bases and continued contact with the bottom of the upper cage base causes the collapsible feeder to collapse (e.g., 602 in FIG. 18) onto the floor of the lower cage base.

In some embodiments, the location of a disengaged cage component or disengaged cage component mount member can be configured based on placement of the engaged cage component or cage component mount member relative to a cage base wall interior or exterior surface or a cage cover interior or exterior surface. For example, a feeder member that is engaged with the internal surface of one or more cage walls, when disengaged will be located in the interior of a cage base. In another example, a card holder that is engaged with the upper surface of a cage cover, when disengaged will be located exterior to a cage cover.

In some embodiments dislodged or disengaged cage components and/or cage component mount members that remain with nested bases or nested covers can be recycled together. In some embodiments dislodged or disengaged cage components and/or cage component mount members do not remain with nested bases or nested covers (are external) can be collected for recycling or reuse.

Nesting of cage covers can also generate either an upward directed or a downward directed force that that could dislodge or disengage a cage component or cage component mount member from a cage cover or could collapse or crushed a cage component that remains associated with a cover.

Figure 13:
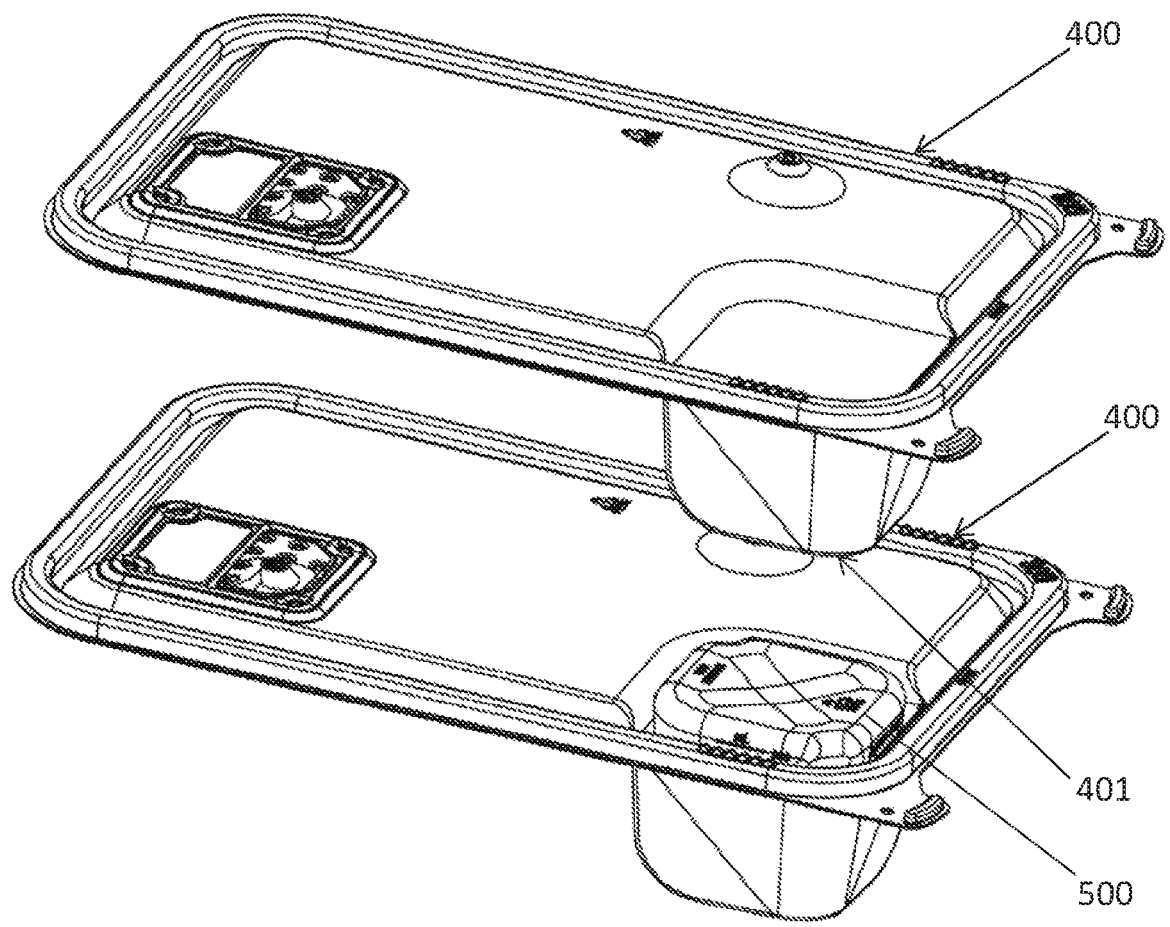
FIG. 13 shows an isometric view of nesting of a cage cover including a water pouch with another cage cover.
Figure 14:
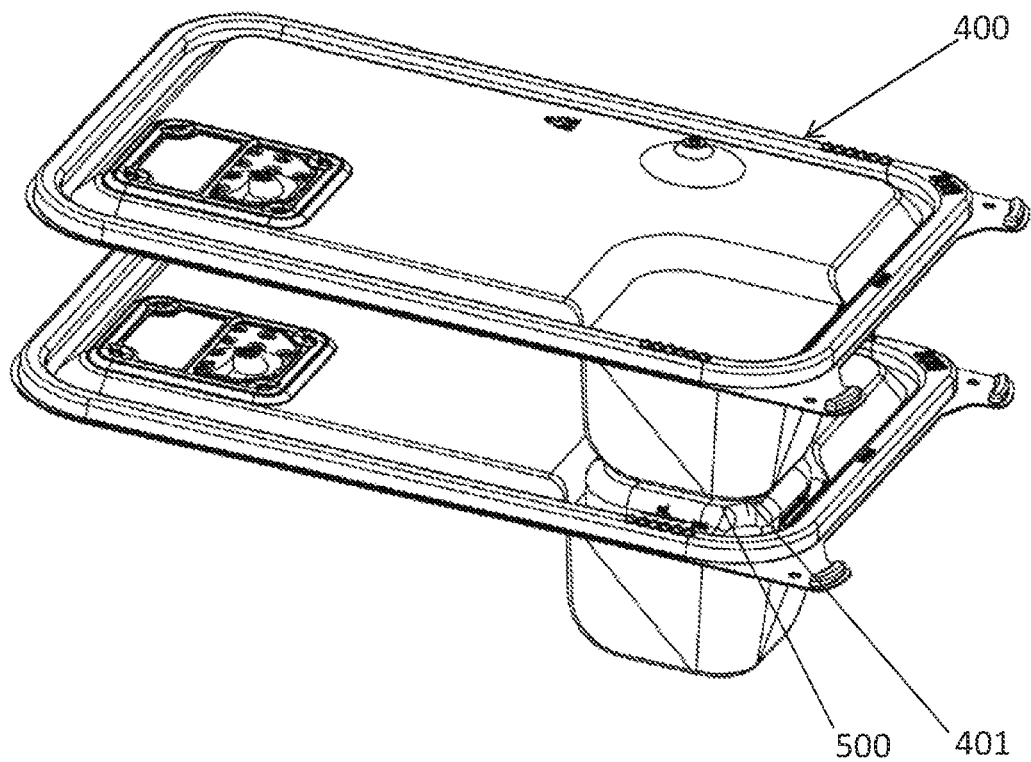
FIG. 14 shows an isometric view of progressed nesting of the cage covers initially shown in FIG. 13.
Figure 15:
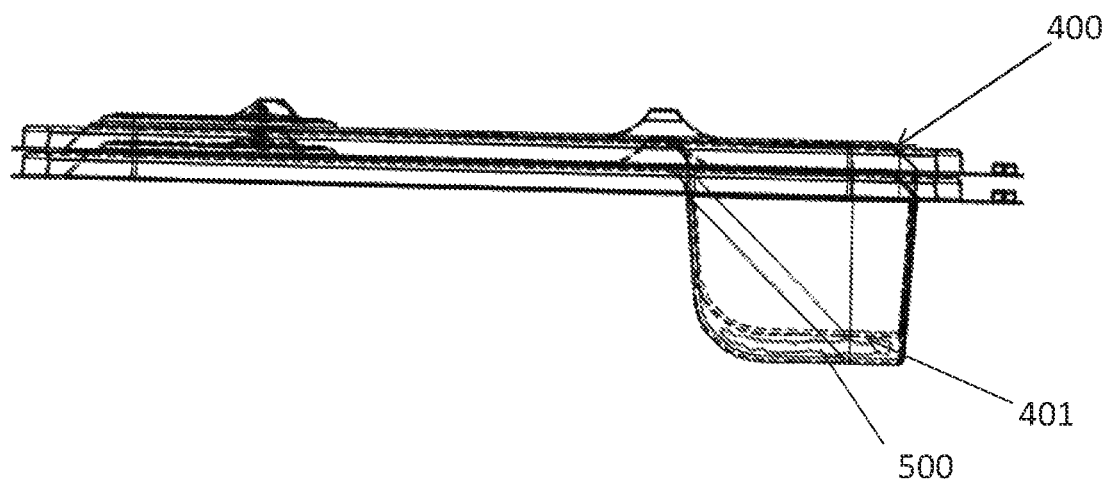
FIG. 15 shows a transparent side view of completed nesting of the cage covers initially shown in FIG. 13.

A non-limiting embodiment of collapsing by nesting is shown in FIGS. 13 to 15. FIGS. 13 to 15 illustrate a progression of nesting of two cage covers (cage covers about to be nested, cage covers partially nested and cage covers fully nested). In this embodiment, nesting of cage covers (e.g., 400 in FIGS. 13, 14 and 15) collapses a water pouch (e.g., 500 in FIGS. 13, 14 and 15) that is in an integral bottle cavity and remains associated with the lower a cage cover. The bottle cavity of the upper cage cover (e.g., 401 in FIGS. 13, 14 and 15) contacts the water pouch in the lower cage cover when the cage covers are nested (see FIG. 14). A downward directed force causes the water pouch to collapse (see FIG. 15).

In some embodiments nesting of cage bases or cage covers to disengage cage components and/or cage component mount members from a cage base or a cage cover can be repeated with a new cage base or cage cover until a desired number of nested cage bases or cage covers are stacked together.

Crushable or Collapsible Components

In some embodiments a cage component and/or a cage component mount element after being disengaged from a sidewall of a cage base remains in the interior of a cage base. Typically, on the interior surface of the cage base bottom. In some embodiments a cage component and/or a cage component mount element that remains in the interior of a cage base is predominately flat and assumes an orientation that presents a small vertical profile (e.g., lies flat) relative to a cage base bottom interior surface. In some embodiments a cage component and/or a cage component mount element that remains in the interior of a cage base has a significant profile (e.g., feed tray). In some embodiments a cage component is placed on the interior surface of the cage base bottom (e.g., a wheel or a dome structure). In some embodiments, a cage component is not engaged with a cage base or a cage cover by a cage mount member, but resides in a holder such as a bottle holder. Such a cage component is not detached by nesting but collapsed or crushed by the act of nesting (see FIGS. 13 to 15). In some embodiments, these components may be constructed so that their structure remains intact when subject to ordinary use in a cage. However, when a cage base is nested with another cage base, the downward force generated by the act of nesting cage bases is transmitted to the cage component by a cage base bottom or portion thereof can be sufficient to compromise the structure of the cage component in whole or in part. In some embodiments the cage component is broken, crushed, flattened or collapsed to a sufficient extent that nesting of cage bases is not significantly affected. In some embodiments, such a cage component (e.g., wheel or dome structure, housing structure) can remain in a cage base, eliminating the need for manual removal prior to nesting. In some embodiments the cage component becomes part of the materials ready for recycling.

Figure 19:
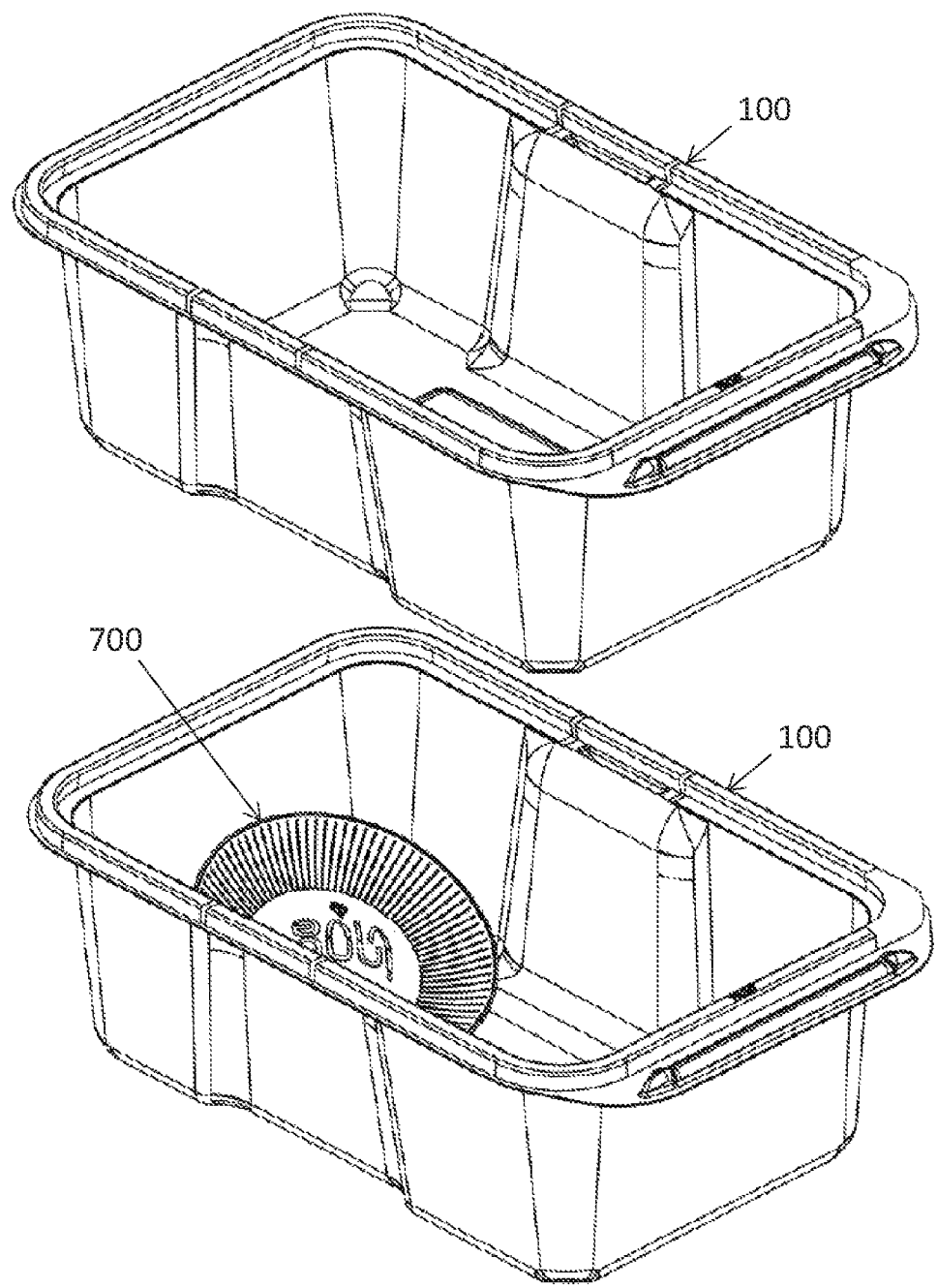
FIG. 19 shows an isometric view of nesting of a cage base including a collapsible enrichment wheel with another cage base.
Figure 20:
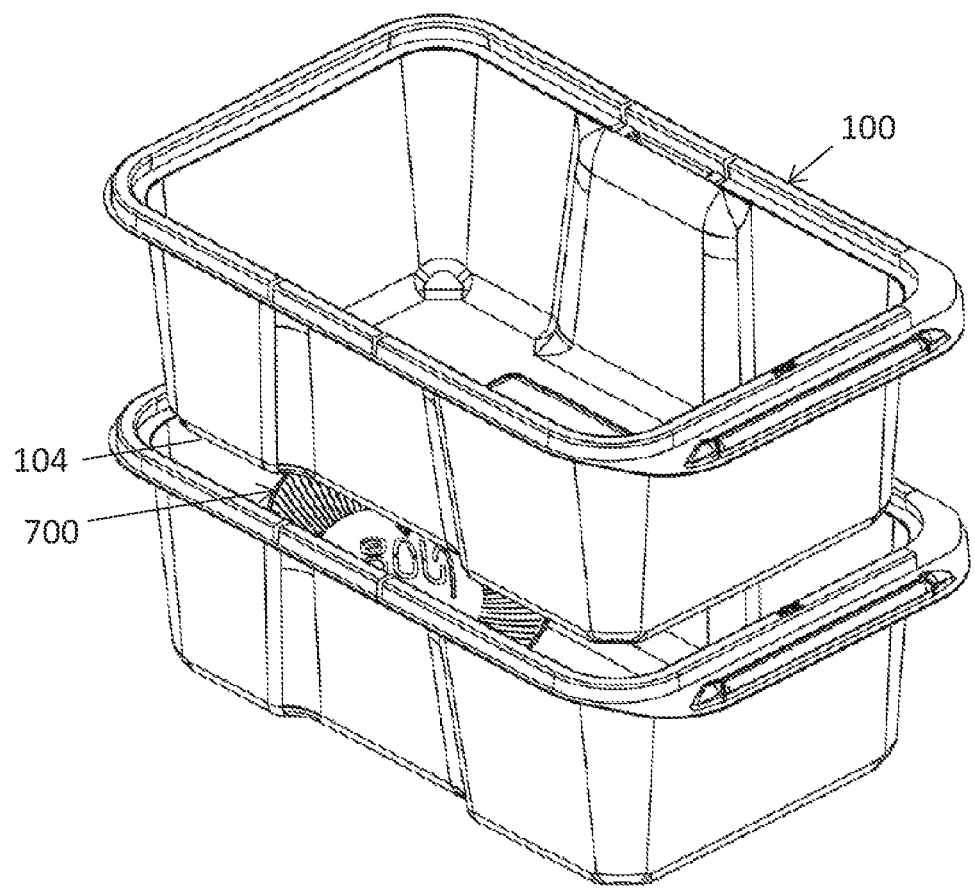
FIG. 20 shows an isometric view of progressed nesting of the cage bases initially shown in FIG. 19.
Figure 21:
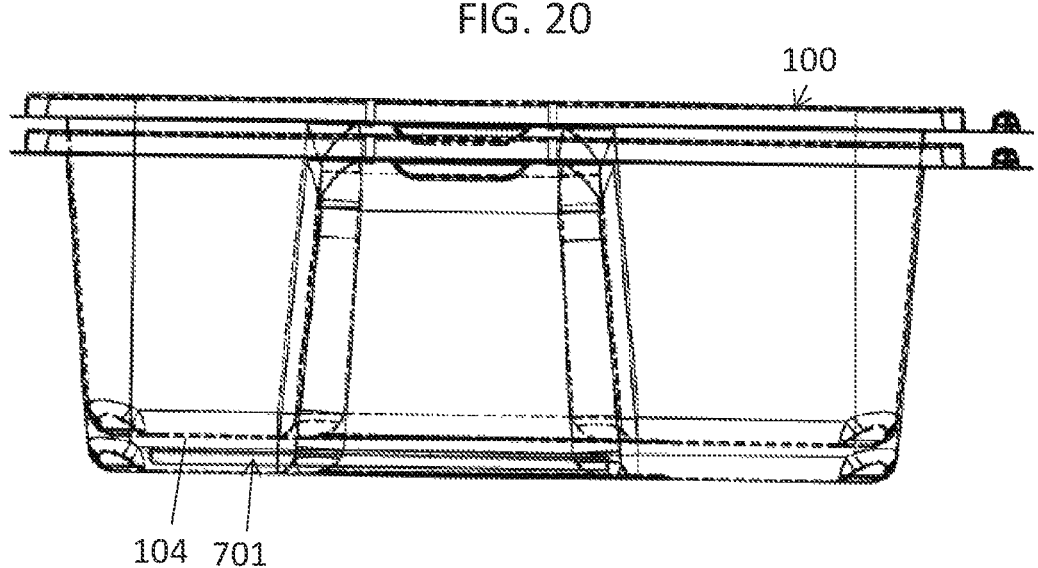
FIG. 21 shows a transparent side view of completed nesting of the cage bases initially shown in FIG. 19.

A non-limiting embodiment of nesting resulting in the collapse of a cage component that is placed in the interior of a cage base is shown in FIGS. 19 to 21. FIGS. 19 to 21 illustrate a progression of nesting of two cage bases (cage bases about to be nested, cage bases partially nested and cage bases fully nested). In this embodiment, collapsible enrichment wheel (e.g., 700 in FIGS. 19 and 20) is not removed from the interior of a cage base prior to nesting. In this embodiment, nesting of cage bases (e.g., 100 in FIGS. 19, 20 and 21) results in the bottom of the upper cage base (e.g., 104 in FIGS. 20 and 21) contacting the collapsible enrichment wheel on the floor of the lower cage base with sufficient downward directed force to result in the collapse of the collapsible enrichment wheel (e.g., 701 in FIG. 21) onto the floor of the lower cage base, where it will remain for recycling.

Manufacture

Cage bases, cages covers, cage components and cage component mount members may be manufactured from one or more materials suitable for housing an animal. Non-limiting examples of materials that may be utilized for manufacture of a cage base, a cage lid, a cage component or part thereof or a cage component mount member includes a suitable plastic or polymer (e.g., polypropylene (PE), high-density polyethylene, low-density polyethylene, polyethylene teraphthalate (PET), polyvinyl chloride (PVC), polyethylenefluoroethylene (PEFE), polystyrene (PS), polycarbonate, polystyrene (e.g., high-density polystyrene), acrylnitrile butadiene styrene copolymers, the like or combinations thereof). In certain embodiments a recyclable material is used (e.g., PET). In some embodiments cage bases, a cage lids, cage components and a cage component mount members are all constructed from the same recyclable polymer, such as PET) to eliminate the need to separate different items prior to recycling.

Examples of Embodiments

Provided hereafter are non-limiting examples of certain embodiments of the technology.

A1. An animal containment cage base, comprising:
 a bottom and one or more walls, wherein the walls comprise an interior surface and an exterior surface;
 the cage base is configured for nesting with another cage base;
 one or more cage components and/or one or more cage component mount members engaged with a portion of the cage base; and
 the one or more cage components and the one or more cage component mount members are configured for disengagement from the cage base when the cage base is nested.

A2. The animal containment cage base of embodiment A1, wherein nesting comprises the cage base inserted into another cage base.

A3. The animal containment cage base of embodiment A1, wherein nesting comprises another cage base inserted into the cage base.

A4. The animal containment cage base of any one of embodiments A1 to A3, wherein one or more of the cage components comprise a cage component mount member configured for engagement with a wall of the cage base.

A5. The animal containment cage base of any one of embodiments A1 to A4, wherein a cage component mount member contacts the interior surface of a wall of the cage base.

A6. The animal containment cage base of any one of embodiments A1 to A4, wherein a cage component mount member contacts the exterior surface of a wall of the cage base.

A7. The animal containment cage base of any one of embodiments A1 to A4, wherein a cage component mount member contacts the interior surface and the exterior surface of a wall of the cage base.

A8. The animal containment cage base of embodiment A7, wherein the cage component mount member is a grommet.

A9. The animal containment cage base of embodiment A8, wherein the cage component mount member is configured for use with a water supply tube.

A9.1. The animal containment cage base of embodiment A8, wherein the cage component mount member is configured for use with a sensor member.

A10. The animal containment cage base of any one of embodiments A1 to A9.1, wherein a cage component mount member is configured to be separated into parts, sheared or broken when the cage base is nested.

A11. The animal containment cage base of any one of embodiments A1 to A10, wherein an engaged cage component or a portion thereof or an engaged cage component mount member or portion thereof is configured to be positioned in the interior of the cage base when disengaged from the cage base.

A11.1. The animal containment cage base of any one of embodiments A1 to A10, wherein an engaged cage component or a portion or an engaged cage component mount member or portion thereof is configured to be positioned exterior to the cage base when disengaged from the cage base.

A11.2. The animal containment cage base of any one of embodiments A1 to A10, wherein a portion of an engaged cage component or an engaged cage component mount member is configured to be positioned in the interior of the cage base when disengaged from the cage base and a portion of an engaged cage component or an engaged cage component mount member is configured to be positioned exterior to the cage base when disengaged from the cage base.

A12. The animal cage containment base of embodiment A11 or A11.2, wherein an engaged cage component or a portion thereof or an engaged cage component mount member or portion thereof is configured to be positioned in the interior of the cage base with a flat profile relative to the bottom of the cage base, when disengaged from the cage base.

A12.1 The animal cage containment base of embodiment A11 or A11.2, wherein an engaged cage component or a portion thereof or an engaged cage component mount member or portion thereof is configured to be flattened upon nesting of the cage base.

A13. The animal containment cage base of any one of embodiments A1 to A12.1, wherein a cage component is chosen from one or more of a food tray, a water bottle holder, a water pouch, a water bottle, a card cage holder, a shelter structure, a wheel, a dome and wheel and combinations thereof.

A14. The animal containment cage base of any one of embodiments A1 to A13, wherein a cage base and one or more cage components are single use.

A14.1. The animal containment cage base of any one of embodiments A1 to A14, wherein a cage base and one or more cage components and/or one or more cage component mount member are made of the same recyclable material.

A15. The animal containment cage base of any one of embodiments A1 to A14.1, wherein a cage base or a cage base and a cage component are made of a polymer.

A16. The animal containment cage base of embodiment A15, wherein the polymer is recyclable.

A17. The animal containment cage base of embodiment A16, wherein the polymer is polyethylene terephthalate.

A18. The animal containment cage base of any one of embodiments A1 to A17, wherein the walls of the base are of a substantially uniform thickness of about 0.01 to about 0.08 inches.

A19. The animal containment cage base of embodiment A18, wherein the walls of the base are of a substantially uniform thickness of about 0.01 to about 0.03 inches.

A20. The animal containment cage base of any one of embodiments A1 to A19, wherein the walls taper inward toward the bottom.

A21. The animal containment cage base of any one of embodiments A1 to A20, wherein the animal containment cage base is a rodent containment cage base.

B1. A set of animal containment cage bases, comprising:

a first cage base comprising a bottom and one or more walls, wherein the walls comprise an interior surface and an exterior surface;

a second cage base comprising a bottom and one or more walls;

the first cage base is configured for nesting with the second cage base;

the second cage base is configured for nesting with the first cage base;

one or more cage components and/or one or more cage component mount members engaged with a portion of the first cage base; and the one or more cage components and the one or more cage component mount members are configured for disengagement from the first cage base when the first cage base and the second cage base are nested.

B2. The set of animal containment cage bases of embodiment B1, wherein nesting comprises a first cage base inserted into a second cage base.

B2.1. The set of animal containment cage bases of embodiment B2, wherein disengagement comprises a top edge of a wall of a second cage base contacting a cage component and/or a cage component mount member.

B3. The set of animal containment cage bases of embodiment B1, wherein nesting comprises a second cage base inserted into a first cage base.

B3.1. The set of animal containment cage bases of embodiment B3, wherein disengagement comprises the bottom or a portion thereof of the second cage base contacting a cage component and/or a cage component mount member of the first base.

B4. The set of animal containment cage bases of any one of embodiments B1 to B3.1, wherein one or more of the cage components comprise a cage component mount member configured for engagement with a wall of the first cage base.

B5. The set of animal containment cage bases of any one of embodiments B1 to B4, wherein a cage component mount member contacts the interior surface of a wall of the first cage base.

B6. The set of animal containment cage bases of any one of embodiments B1 to B4, wherein a cage component mount member contacts the exterior surface of a wall of the first cage base.

B7. The set of animal containment cage bases of any one of embodiments B1 to B4, wherein a cage component mount member contacts the interior surface and the exterior surface of a wall of the first cage base.

B8. The set of animal containment cage bases of embodiment B7, wherein the cage component mount member is a grommet.

B9. The set of animal containment cage bases of embodiment B8, wherein the cage component mount member is configured for use with a water supply tube.

B9.1. The set of animal containment cage bases of embodiment B8, wherein the cage component mount member is configured for use with a sensor member.

B10. The set of animal containment cage bases of any one of embodiments B1 to B9.1, wherein a cage component mount member is configured to be separated into parts, sheared or broken when the first cage base and the second cage base are nested.

B11. The set of animal containment cage bases of any one of embodiments B1 to B10, wherein an engaged cage component or a portion thereof or an engaged cage component mount member or portion thereof is configured to be positioned in the interior of the first cage base when disengaged from the first cage base.

B11.1. The set of animal containment cage bases of any one of embodiments B1 to B10, wherein an engaged cage component or a portion or an engaged cage component mount member or portion thereof is configured to be positioned exterior to the first cage base when disengaged from the first cage base.

B11.2. The set of animal containment cage bases of any one of embodiments B1 to B10, wherein a portion of an engaged cage component or an engaged cage component mount member is configured to be positioned in the interior of the first cage base when disengaged from the first cage base and a portion of an engaged cage component or an engaged cage component mount member is configured to be positioned exterior to the first cage base when disengaged from the first cage base.

B12. The set of animal cage containment bases of embodiment B11 or B11.2, wherein an engaged cage component or a portion thereof or an engaged cage component mount member or portion thereof is configured to be positioned in the interior of the first cage base with a flat profile relative to the bottom of the first cage base, when disengaged from the first cage base.

B12.1 The animal cage containment base of embodiment B11 or B11.2, wherein an engaged cage component or a portion thereof or an engaged cage component mount member or portion thereof is configured to be flattened upon nesting of the first cage base and the second cage base.

B13. The set of animal containment cage bases of any one of embodiments B1 to B12.1, wherein a cage component is chosen from one or more of a food tray, a water bottle holder, a water pouch, a water bottle a card cage holder, a shelter structure, a wheel, a dome and wheel and combinations thereof.

B14. The set of animal containment cage bases of any one of embodiments B1 to B13, wherein the cage bases and one or more cage components are single use.

B14.1. The set of animal containment cage bases of any one of embodiments B1 to B14, wherein a first and second cage base and one or more cage components and/or one or more cage component mount member are made of the same recyclable material.

B15. The set of animal containment cage bases of any one of embodiments B1 to B14.1, wherein the cage bases or the cage bases and a cage component are made of a polymer.

B16. The set of animal containment cage bases of embodiment B15, wherein the polymer is recyclable.

B17. The set of animal containment cage bases of embodiment B16, wherein the polymer is polyethylene terephthalate.

B18. The set of animal containment cage bases of any one of embodiments B1 to B17, wherein the walls of the bases are of a substantially uniform thickness of about 0.01 to about 0.08 inches.

B19. The set of animal containment cage bases of embodiment B18, wherein the walls of the bases are of a substantially uniform thickness of about 0.01 to about 0.03 inches.

B20. The set of animal containment cage bases of any one of embodiments B1 to B19, wherein the walls of the bases taper inward toward the bottom.

B21. The set of animal containment cage bases of any one of embodiments B1 to B20, wherein the animal containment cage bases are rodent containment cage bases.

B22. The set of animal containment cage bases of any one of embodiments B1 to B21, wherein nesting is 75% or more.

B23. The set of animal containment cage bases of any one of embodiments B1 to B21, wherein nesting is 80% or more.

B24. The set of animal containment cage bases of any one of embodiments B1 to B21, wherein nesting is 85% or more.

B25. The set of animal containment cage bases of any one of embodiments B1 to B21, wherein nesting is 90% or more.

B26. The set of animal containment cage bases of any one of embodiments B1 to B21, wherein nesting is 95% or more.

C1. A method for disengaging one or more cage components and/or cage component mount members from an animal containment cage base comprising;

nesting a first cage base comprising a bottom and one or more walls and one or more cage components and/or one or more cage component mount members with a second cage base comprising a bottom and one or more walls, whereby the one or more cage components and/or one or more cage component mount members are disengaged from the first cage base.

C2. The method of embodiment C1, wherein a cage component is chosen from one or more of a food tray, a water bottle holder, a water pouch, a water bottle, a card cage holder, a shelter structure, a wheel, a dome and wheel and combinations thereof.

C3. The method of embodiment C1 or C2, wherein nesting with a second cage base comprises a first cage base inserted into a second cage base.

C4. The method of embodiment C3, wherein disengagement from a first cage base comprises a top edge of a wall of a second cage base contacting a cage component or a cage component mount member of a first cage base.

C5. The method of embodiment C1 or C2, wherein nesting with a second cage base comprises a second cage base inserted into a first cage base.

C6. The method of embodiment C5, wherein disengagement comprises the bottom or portion thereof of a second cage base contacting a cage component or a cage component mount member of a first cage base.

C7. The method of any one of embodiments C1 to C6, wherein one or more of the cage components comprise a cage component mount member for engagement with a wall of a first cage base.

C7.1. The method of embodiment C7, wherein the cage component mount member contacts the interior surface of a wall of a first cage base.

C7.2. The method of embodiment C7, wherein the cage component mount member contacts the exterior surface of a wall of a first cage base.

C8. The method of embodiment C7, wherein the cage component mount member contacts an interior surface and an exterior surface of a wall of a first cage base.

C9. The method of embodiment C8, wherein the cage component mount member is a grommet.

C10. The method of embodiment C9, wherein the cage component mount member is configured for use with a water supply tube.

C11. The method of embodiment C9, wherein the cage component mount member is configured for use with a sensor member.

C12. The method of any one of embodiments C7 to C11, wherein the cage component mount member is configured to be separated into parts, sheared or broken when a first cage base and a second cage base are nested.

C13. The method of any one of embodiments C1 to C6, wherein a disengaged cage component or a portion thereof or a disengaged cage component mount member or portion thereof is in the interior of a first cage base.

C14. The method of any one of embodiments C1 to C6, wherein a disengaged cage component or a portion thereof or a disengaged cage component mount member or portion thereof is exterior to a first cage base.

C15. The method of any one of embodiments C1 to C6, wherein a portion of a disengaged cage component or a disengaged cage component mount member is in the interior of a first cage base and a portion of a disengaged cage component or a disengaged cage component mount member is exterior to a first cage base.

C16. The method of embodiment C13 or C15, wherein a disengaged cage component or a portion thereof or cage component mount member or portion thereof in the interior of a first cage base is oriented to be flat relative to the bottom of a first cage base.

C16.1. The method of embodiment C13 or C15, wherein an engaged cage component or a portion thereof or an engaged cage component mount member or portion thereof is flattened upon nesting of the first cage base and the second cage base.

C16.2. The method of embodiment C14 or C15, wherein a disengaged cage component or a portion thereof or cage component mount member or portion thereof exterior to a first cage base is collected for reuse.

C17. The method of any one of embodiments C1 to C16, wherein the first and second nested cage bases and one or more cage components or one or more cage component mount members are disposed of.

C18. The method of any one of embodiments C1 to C16.1, wherein first and second nested cage bases and one or more cage components are single use.

C19. The method of any one of embodiments C1 to C18, wherein the cage bases, the cage components and/or the cage component mount members are made of a polymer.

C20. The method of embodiment C19, wherein the polymer is recyclable.

C20.1. The method of embodiment C20, wherein the cage bases, the cage components and/or the cage component mount members are made of the same recyclable polymer.

C21. The method of embodiment C20 or C20.1, wherein the polymer is polyethylene terephthalate.

C21. The method of any one of embodiments C1 to C16.2 and C18 to C21, wherein the first and second nested cage bases, one or more cage components and/or one or more cage component mount members are in condition to be recycled.

C22. The method of any one of embodiments C1 to C21, wherein the walls of the bases are of a substantially uniform thickness of about 0.01 to about 0.08 inches.

C23. The method of embodiment C22, wherein the walls of the bases are of a substantially uniform thickness of about 0.01 to about 0.03 inches.

C24. The method of any one of embodiments C1 to C23, wherein nesting is 75% or more.

C25. The method of any one of embodiments C1 to C23, wherein nesting is 80% or more.

C26. The method of any one of embodiments C1 to C23, wherein nesting is 85% or more.

C27. The method of any one of embodiments C1 to C23, wherein nesting is 90% or more.

C28. The method of any one of embodiments C1 to C23, wherein nesting is 95% or more.

C29. The method of any one of embodiments C1 to C28, wherein the walls taper inward toward the bottom.

C30. The method of any one of embodiments C1 to C29, wherein the animal containment cage base is a rodent containment cage base.

D1. A animal containment cage cover, comprising:
a planar region comprising an interior surface and an exterior surface and a flange region extending around a perimeter of the cover;
the cage cover is configured for nesting with another cage cover;
one or more cage components and/or one or more cage component mount members engaged with a portion of the planar region of a cage cover; and
the cage components and the cage component mount members are configured for disengagement from the cage cover when cage cover is nested.

D2. The animal containment cage cover of embodiment D1, wherein nesting comprises the cage cover inserted into another cage cover.

D3. The animal containment cage cover of embodiment D1, wherein nesting comprises another cage cover inserted into the cage cover.

D4. The animal containment cage cover of any one of embodiments D1 to D3, wherein one or more of the cage components comprise a cage component mount member configured for engagement with the cage cover.

D5. The animal containment cage cover of embodiment D4, wherein the cage component mount member contacts the interior surface of the planar region of the cage cover.

D6. The animal containment cage cover of embodiment D4, wherein the cage component mount member contacts the exterior surface of the planar region of the cage cover.

D7. The animal containment cage cover of embodiment D4, wherein the cage component mount member contacts the interior surface and the exterior surface of the planar region of the cage cover.

D8. The animal containment cage cover of embodiment D7, wherein the cage component mount member is a grommet.

D9. The animal containment cage cover of embodiment D8, wherein the cage component mount member is configured for use with a water supply tube.

D9.1. The animal containment cage cover of embodiment D8, wherein the cage component mount member is configured for use with a sensor member.

D10. The animal containment cage cover of any one of embodiments D4 to D9.1, wherein the cage component mount member is configured to be separated into parts, sheared or broken when the cage cover is nested.

D11. The animal containment cage cover of any one of embodiments D1 to D3, wherein an engaged cage component or a portion thereof or an engaged cage component mount member or portion thereof is configured to remain in contact with the cage cover when disengaged from the cage cover.

D11.1. The animal containment cage cover of any one of embodiments D1 to D3, wherein an engaged cage component or a portion thereof or an engaged cage component mount member or portion thereof is configured to be separate from the cage cover when disengaged from the cage cover.

D11.2. The animal containment cage cover of any one of embodiments D1 to D3, wherein a portion of an engaged cage component or an engaged cage component mount member is configured to remain in contact with the cage cover when disengaged from the cage cover and a portion of an engaged cage component or an engaged cage component mount member is configured to be separate from the cage cover when disengaged from the cage cover.

D12. The animal cage containment cover of embodiment D11 or D11.2, wherein an engaged cage component or a portion thereof or an engaged cage component mount member or portion thereof is configured to remain in contact with the cage cover with a flat profile relative to the planar region of the cage cover, when disengaged from the cage cover.

D12.1 The animal cage containment base of embodiments D11 to D.11.2, wherein an engaged cage component or a portion thereof or an engaged cage component mount member or portion thereof is configured to be flattened upon nesting of the cage cover.

D13. The animal containment cage cover of any one of embodiments D1 to D12.1, wherein a cage component is chosen from one or more of a food tray, a water bottle holder, a water pouch, a water bottle a card cage holder, a shelter structure, a wheel, a dome and wheel and combinations thereof.

D14. The animal containment cage cover of any one of embodiments D1 to D13, wherein a cage cover and one or more cage components are single use.

D14.1. The animal containment cage cover of any one of embodiments D1 to D14, wherein a cage cover and one or more cage components and/or one or more cage component mount members are made of the same recyclable material.

D15. The animal containment cage cover of any one of embodiments D1 to D14.1, wherein a cage cover or a cage cover and a cage component are made of a polymer.

D16. The animal containment cage cover of embodiment D15, wherein the polymer is recyclable.

D17. The animal containment cage cover of embodiment D16, wherein the polymer is polyethylene terephthalate.

D18. The animal containment cage cover of any one of embodiments D1 to D17, wherein the cover is of a substantially uniform thickness of about 0.01 to about 0.08 inches.

D19. The animal containment cage cover of embodiment D18, wherein the cover is of a substantially uniform thickness of about 0.01 to about 0.03 inches.

D20. The animal containment cage cover of any one of embodiments D1 to D19, wherein the animal containment cage cover is a rodent animal containment cage cover.

E1. A set of animal containment cage covers, comprising:
a first cage cover comprising a planar region comprise an interior surface and an exterior surface and a flange region extending around a perimeter of the cover;
a second cage cover comprising a planar region comprise an interior surface and an exterior surface and a flange region extending around a perimeter of the cover;
the first cage cover is configured for nesting with the second cage cover;
the second cage cover is configured for nesting with the first cage cover;
one or more cage components and/or one or more cage component mount members engaged with a portion of the first cage cover; and
the cage components and the cage component mount members are configured for disengagement from the first cage cover when the first cage cover and the second cage cover are nested.

E2. The set of animal containment cage covers of embodiment E1, wherein nesting comprises a first cage cover inserted into a second cage cover.

E2.1. The set of animal containment cage covers of embodiment E2, wherein disengagement comprises the flange region or portion thereof and/or the external surface or portion thereof of a planar region of a second cage cover contacting a cage component and/or a cage component mount member of the first cage cover.

E3. The set of animal containment cage covers of embodiment E1, wherein nesting comprises a second cage cover inserted into a first cage cover.

E3.1. The set of animal containment cage covers of embodiment E3, wherein disengagement comprises the flange region or portion thereof and/or the internal surface or portion thereof of a planar region of the second cage cover contacting a cage component and/or a cage component mount member of the first cage cover.

E4. The set of animal containment cage covers of any one of embodiments E1 to E3.1, wherein one or more of the cage components comprise a cage component mount member configured for engagement with the first cage cover.

E5. The set of animal containment cage covers of embodiment E4, wherein the cage component mount member contacts the interior surface of the planar region of the first cage cover.

E6. The set of animal containment cage covers of embodiment E4, wherein the cage component mount member contacts the exterior surface of the planar region of the first cage cover.

E7. The set of animal containment cage covers of embodiment E4, wherein the cage component mount member contacts the interior surface and the exterior surface of the first cage cover.

E8. The set of animal containment cage covers of embodiment E7, wherein the cage component mount member is a grommet.

E9. The set of animal containment cage covers of embodiment E8, wherein the cage component mount member is configured for use with a water supply tube.

E9.1. The set of animal containment cage covers of embodiment E8, wherein the cage component mount member is configured for use with a sensor member.

E10. The set of animal containment cage covers of any one of embodiments E4 to E9.1, wherein a cage component mount member is configured to be separated into parts, sheared or broken when the first cage cover and the second cage cover are nested.

E11. The set of animal containment cage covers of any one of embodiments E1 to E3.1, wherein an engaged cage component or a portion thereof or an engaged cage component mount member or portion thereof is configured to be positioned between the first and second cage covers, when disengaged from the first cage cover.

E11.1. The set of animal containment cage covers of any one of embodiments E1 to E3.1, wherein an engaged cage component or a portion thereof or an engaged cage component mount member or portion thereof is configured to be positioned exterior to or separate from the first cage cover, when disengaged from the first cage cover.

E11.2. The set of animal containment cage covers of any one of embodiments E1 to E3.1, wherein a portion of an engaged cage component or an engaged cage component mount member is configured to be positioned between the first and second cage covers, when disengaged from the first cage cover and a portion of an engaged cage component or an engaged cage component mount member is configured to be positioned exterior to or separate from the first cage cover, when disengaged from the first cage cover.

E12. The set of animal cage containment covers of embodiment E11 or E11.2, wherein an engaged cage component or a portion thereof or an engaged cage component mount member or portion thereof is configured to be positioned between the first and second cage covers with a flat profile relative to the planar region of the first cage cover, when disengaged from the first cage cover.

E12.1. The animal cage containment base of embodiment E11 or E11.2, wherein an engaged cage component or a portion thereof or an engaged cage component mount member or portion thereof is configured to be flattened upon nesting of the first and second cage covers.

E13. The set of animal containment cage covers of any one of embodiments E1 to E12.1, wherein a cage component is chosen from one or more of a food tray, a water bottle holder, a water pouch, a water bottle a card cage holder, a shelter structure, a wheel, a dome and wheel and combinations thereof.

E14. The set of animal containment cage covers of any one of embodiments E1 to E13, wherein the cage covers and one or more cage components are single use.

E14.1. The set of animal containment cage covers of any one of embodiments E1 to E14, wherein the cage covers and one or more cage components and/or one or more cage component mount members are made of the same recyclable material.

E15. The set of animal containment cage covers of any one of embodiments E1 to E14.1, wherein the cage covers or the cage covers and a cage component are made of a polymer.

E16. The set of animal containment cage covers of embodiment E15, wherein the polymer is recyclable.

E17. The set of animal containment cage covers of embodiment E16, wherein the polymer is polyethylene terephthalate.

E18. The set of animal containment cage covers of any one of embodiments E1 to E17, wherein the cage covers are of a substantially uniform thickness of about 0.01 to about 0.08 inches.

E19. The set of animal containment cage covers of embodiment E18, wherein the cage covers are of a substantially uniform thickness of about 0.01 to about 0.03 inches.

E20. The set of animal containment cage covers of any one of embodiments E1 to E19, wherein the animal is a rodent.

E21. The set of animal containment cage covers of any one of embodiments E1 to E20, wherein nesting is 70% or more.

E22. The set of animal containment cage covers of any one of embodiments E1 to E20, wherein nesting is 80% or more.

E23. The set of animal containment cage covers of any one of embodiments E1 to E20, wherein nesting is 85% or more.

E24. The set of animal containment cage covers of any one of embodiments E1 to E20, wherein nesting is 90% or more.

E25. The set of animal containment cage covers of any one of embodiments E1 to E20, wherein nesting is 95% or more.

E26. The set of animal containment cage covers of any one of embodiments E1 to E25, wherein the animal containment cage covers are rodent containment cage covers.

F1. A method for disengaging one or more cage components and/or cage component mount members from an animal containment cage cover comprising;

nesting a first cage cover comprising a planar region comprising an interior surface and an exterior surface and a flange region extending around a perimeter of the cover and one or more cage components and/or one or more cage component mount members engaged with a portion of the first cage cover with a second cage cover comprising a planar region comprising an interior surface and an exterior surface and a flange region extending around a perimeter of the cover, whereby the one or more cage components and/or one or more cage component mount members are disengaged from the first cage cover.

F2. The method of embodiment F1, wherein a cage component is chosen from one or more of a food tray, a water bottle holder, a water pouch, a water bottle, a card cage holder, a shelter structure, a wheel, a dome and wheel and combinations thereof.

F3. The method of embodiment F1 or F2, wherein nesting with a second cage cover comprises a first cage cover inserted into a second cage cover.

F4. The method of embodiment F3, wherein disengagement from a first cage cover comprises a flange region or portion thereof and/or the external surface or portion thereof of a planar region of a second cage cover contacting a cage component and/or a cage component mount member of the first cage cover.

F5. The method of embodiment F1 or F2, wherein nesting with a second cage cover comprises a second cage cover inserted into a first cage cover.

F6. The method of embodiment F5, wherein disengagement comprises the flange region or portion thereof and/or the internal surface or portion thereof of a planar region of the second cage cover contacting a cage component and/or a cage component mount member of the first cage cover.

F7. The method of any one of embodiments F1 to F6, wherein one or more of the cage components comprise a cage component mount member for engagement with the planar region of a first cage cover.

F7.1. The method of embodiment F7, wherein a cage component mount member contacts the interior surface of the planar region of a first cage cover.

F7.2. The method of embodiment F7, wherein a cage component mount member contacts the exterior surface of the planar region of a first cage cover.

F8. The method of embodiment F7, wherein a cage component mount member contacts an interior surface and an exterior surface of the planar region of a first cage cover.

F9. The method of embodiment F8, wherein the cage component mount member is a grommet.

F10. The method of embodiment F9, wherein the cage component mount member is configured for use with a water supply tube.

F11. The method of embodiment F9, wherein the cage component mount member is configured for use with a sensor member.

F12. The method of any one of embodiments F7 to F11, wherein a cage component mount member is configured to be separated into parts, sheared or broken when a first cage cover and a second cage cover are nested.

F13. The method of any one of embodiments F1 to F6, wherein an engaged cage component or a portion thereof or an engaged cage component mount member or portion thereof is configured to be positioned between a first and a second cage cover when disengaged from a first cage cover.

F14. The method of any one of embodiments F1 to F6, an engaged cage component or a portion or an engaged cage component mount member or portion thereof is configured to be to be positioned separate from a first cage cover when disengaged from the first cage cover.

F15. The method of any one of embodiments F1 to F6, wherein a portion of an engaged cage component or an engaged cage component mount member is configured to be positioned between a first cage cover and a second cage cover when disengaged from the first cage cover and a portion of an engaged cage component or an engaged cage component mount member is configured to be positioned exterior to or separate from a first cage cover when disengaged from the first cage cover.

F16. The method of embodiment F13 or F15, wherein a disengaged cage component or a portion thereof or cage component mount member or portion thereof between a first and a second cage cover is oriented to have flat profile relative to the planar region of the first cage cover.

F16.1. The method of embodiment F13 or F15, wherein an engaged cage component or a portion thereof or an engaged cage component mount member or portion thereof is flattened upon nesting of the first and second cage covers.

F16.2. The method of embodiment F14 or F15, wherein a disengaged cage component or a portion thereof or a disengaged cage component mount member or portion thereof exterior to or separate from a first cage cover is collected for reuse.

F17. The method of any one of embodiments F1 to F16.1, wherein the first and second nested cage covers and one or more cage components or one or more cage component mount members are disposed of.

F18. The method of any one of embodiments F1 to F16.1 and F17, wherein first and second nested cage covers and one or more cage components are single use.

F19. The method of any one of embodiments F1 to F18, wherein the cage covers, cage components and cage component mount members are made of a polymer.

F20. The method of embodiment F19, wherein the polymer is recyclable.

F20.1. The method of embodiment F20, the cage covers, cage components and cage component mount members are made of the same recyclable polymer.

F21. The method of embodiment F20 or F20.1, wherein the polymer is polyethylene terephthalate.

F21.1. The method of any one of embodiments F1 to F16.2 and F18 to F21, wherein the first and second nested cage covers, one or more cage components and/or one or more cage component mount members are in condition to be recycled.

F22. The method of any one of embodiments F1 to F21.1, wherein the walls of the covers are of a substantially uniform thickness of about 0.01 to about 0.08 inches.

F23. The method of embodiment F22, wherein the walls of the covers are of a substantially uniform thickness of about 0.01 to about 0.03 inches.

F24. The method of any one of embodiments F1 to F23, wherein nesting is 75% or more.

F25. The method of any one of embodiments F1 to F23, wherein nesting is 80% or more.

F26. The method of any one of embodiments F1 to F23, wherein nesting is 85% or more.

F27. The method of any one of embodiments F1 to F23, wherein nesting is 90% or more.

F28. The method of any one of embodiments F1 to F23, wherein nesting is 95% or more.

F29. The method of any one of embodiments F1 to F28, wherein the walls taper inward toward the bottom.

F30. The method of any one of embodiments F1 to F29, wherein the animal containment cage covers are rodent containment cage covers.

G1. A detachable animal containment cage component grommet, comprising:
an interior member comprising an aperture for insertion of a cage component; and
an exterior member comprising a sliding door to allow access to the aperture; wherein the interior member and the exterior member are configured for engagement and for disengagement.

G2. The animal containment cage component grommet of embodiment G1, wherein the interior and the exterior members are engaged and the grommet is attached to a wall of an animal containment cage base.

G3. The animal containment cage component grommet of embodiment G2, wherein upward deflection of the exterior member relative to the interior member results in disengagement of the exterior member from the interior member and detachment of the grommet from the cage base wall.

G4. The animal containment cage component grommet of embodiment G2 or G3, wherein the interior member contacts an interior surface of the wall and the exterior member contacts an exterior surface of the wall.

G5. The animal containment cage component grommet of any one of embodiments G1 to G4, wherein the interior member comprises a male sliding member and the exterior member comprises a female sliding member.

G6. The animal containment cage component grommet of embodiment G5, wherein, engagement comprises downward movement of the female sliding member relative to the male sliding member.

G7. The animal containment cage component grommet of embodiment G5, wherein, disengagement comprise upward movement of the female sliding member relative to the male sliding member.

G8. The animal containment cage component grommet of any one of embodiments G1 to G7, wherein the cage component is a water supply tube.

G9. The animal containment cage grommet of embodiment G8, wherein the sliding door comprises a sloped surface and the sliding door is configured to open when the sloped surface is contacted by the water supply tube and to close when not in contact with the water supply tube.

G10. The animal containment cage grommet of any one of embodiments G1 to G9, wherein the interior member and the exterior member are made of recyclable plastic.

H1. A method of detaching an animal containment cage component grommet from an animal containment cage comprising:
nesting a first cage base comprising an animal containment cage component grommet with a second cage base comprising a bottom and one or more walls, whereby the animal containment cage component grommet is detached from the first cage base.

H2. The method of embodiment H1, wherein nesting a first cage base with a second cage base comprises a first cage base inserted into a second cage base.

H3. The method of embodiment H2, wherein a top edge of a wall of a second cage base contacts the animal containment cage component grommet.

H4. The method of embodiment H3, wherein the top edge of the wall of the second cage base is a flange.

H5. The method of embodiment H3 or H4, wherein the animal containment cage component grommet comprises an interior member engaged with an exterior member and the wall of the second cage base contacts the exterior member of the animal containment cage component grommet.

H5.1. The method of embodiment H5, wherein the exterior member comprises an extension member and the extension member contacts the top edge of the wall of the second cage base.

H6. The method of embodiment H5 or H5.1, wherein contact of the wall of the second cage base with the exterior member results upward displacement of the exterior member relative to the interior member.

H7. The method of embodiment H6, wherein upward displacement of the exterior member relative to the interior member results in the exterior member of the grommet disengaging from the interior member of the grommet and the grommet detaching from the cage base wall.

H8. The method of embodiment H7, wherein the detached interior member is in the interior of the first cage base.

H9. The method of embodiment H7, wherein the detached exterior member is exterior to the first cage base.

H10. The method of embodiment H9, wherein the detached exterior member is collected for reuse.

H11. The method of any one of embodiments H1 to H10, wherein the cage bases and the grommet are made of the same recyclable polymer.

H12. The method of any one of embodiment H1 to H11, wherein the animal containment cage component grommet is configured for use with a water supply tube.

H13. The method of embodiment H8, wherein a disengaged grommet in the interior of a first cage base is oriented to be flat relative to the bottom of a first cage base.

H14 The method of any one of embodiments H1 to H13, wherein the detachable animal containment cage component grommet is a detachable rodent containment cage component grommet.

I1. A rodent containment cage component grommet, comprising:
an interior member comprising an aperture for insertion of a water supply tube and a male sliding member and
an exterior member comprising a sliding door for access to the aperture; a female sliding member and an extension member,
wherein (i) the male sliding member is configured to engage the female sliding member to associate the interior member and the exterior member and produce an assembled grommet, (ii) the assembled grommet is attached to cage base wall when the interior member is inserted from the interior of a cage base through an opening in a cage base wall to contact the exterior member positioned exterior to the cage base to engage the male and female sliding members and (iii) the assembled grommet when attached to a cage base wall is disassembled and detached from the cage base wall when the cage base is nested with another cage base and a wall of the other cage base contacts the extension member.

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents. Their citation is not an indication of a search for relevant disclosures. All statements regarding the date(s) or contents of the documents is based on available information and is not an admission as to their accuracy or correctness.

Modifications may be made to the foregoing without departing from the basic aspects of the technology. Although the technology has been described in substantial detail with reference to one or more specific embodiments, those of ordinary skill in the art will recognize that changes may be made to the embodiments specifically disclosed in this application, yet these modifications and improvements are within the scope and spirit of the technology.

The technology illustratively described herein suitably may be practiced in the absence of any element(s) not specifically disclosed herein. Thus, for example, in each instance herein any of the terms "comprising," "consisting essentially of," and "consisting of" may be replaced with either of the other two terms. The terms and expressions which have been employed are used as terms of description and not of limitation, and use of such terms and expressions do not exclude any equivalents of the features shown and described or portions thereof, and various modifications are possible within the scope of the technology claimed. The term "a" or "an" can refer to one of or a plurality of the elements it modifies (e.g., "a reagent" can mean one or more reagents) unless it is contextually clear either one of the elements or more than one of the elements is described. The term "about" as used herein refers to a value within 10% of the underlying parameter (i.e., plus or minus 10%), and use of the term "about" at the beginning of a string of values modifies each of the values (i.e., "about 1, 2 and 3" refers to about 1, about 2 and about 3). For example, a weight of "about 100 grams" can include weights between 90 grams and 110 grams. Further, when a listing of values is described herein (e.g., about 50%, 60%, 70%, 80%, 85% or 86%) the listing includes all intermediate and fractional values thereof (e.g., 54%, 85.4%). Thus, it should be understood that although the present technology has been specifically disclosed by representative embodiments and optional features, modification and variation of the concepts herein disclosed may be resorted to by those skilled in the art, and such modifications and variations are considered within the scope of this technology.

Certain embodiments of the technology are set forth in the claim(s) that follow(s).

What is claimed is:

1. An animal containment cage unit,
    wherein the cage unit comprises a cage base or a cage cover and one or more cage components or one or more cage component mount members;
    the cage unit is configured for nesting with another like cage unit;
    one or more cage components or one or more cage component mount members are engaged with a portion of the cage unit; and
    the one or more cage components or portions thereof or the one or more cage component mount members or portions thereof are configured for disengagement from the cage unit by the nesting of the cage unit with another like cage unit.

2. The animal containment cage unit of claim 1, wherein nesting comprises the animal containment cage unit inserted into another animal containment cage unit, whereby the one or more cage components or portions thereof or the one or more cage component mount members or portions thereof of the animal containment cage unit are disengaged.

3. The animal containment cage unit of claim 1, wherein nesting comprises another animal containment cage unit inserted into the animal containment cage unit, whereby the one or more cage components or portions thereof or the one or more cage component mount members or portions thereof of the animal containment cage unit are disengaged.

4. The animal containment cage unit of claim 1, wherein the cage component mount member is a grommet.

5. The animal containment cage unit of claim 4, wherein the grommet is configured for use with a water supply tube or a sensor.

6. The animal containment cage unit of claim 1, wherein a cage component mount member is configured to be separated into parts, sheared or broken when the animal containment cage unit is nested.

7. The animal cage containment cage unit of claim 1, wherein an engaged cage component or portions thereof or an engaged cage component mount member portion is configured to be positioned in an interior of the cage base when disengaged from the cage base by nesting.

8. The animal cage containment cage unit of claim 7, wherein an engaged cage component mount member portion is configured to have a flat profile in the interior of the cage base.

9. The animal containment cage unit of claim 1, wherein a cage component is chosen from one or more of a food tray, a water bottle holder, a card cage holder, and combinations thereof.

10. The animal containment cage unit of claim 1, wherein the animal containment cage unit and one or more cage components are single use.

11. The animal containment cage unit of claim 1, wherein the animal containment cage unit and one or more cage components or one or more cage component mount members are made of the same recyclable material.

12. A method for disengaging one or more cage components or portions thereof or cage component mount members or portions thereof from an animal containment cage unit comprising;
    nesting a first cage unit comprising one or more cage components or one or more cage component mount members with a second like cage unit, whereby the one or more cage components or portions thereof or one or more cage component mount members or portions thereof are disengaged from the first cage unit.

13. A method of detaching an animal containment cage grommet from an animal containment cage comprising:
    providing a first cage base comprising an animal containment cage grommet comprising an interior member comprising an aperture for insertion of a cage component; and an exterior member comprising a sliding door to allow access to the aperture; wherein the interior member and the exterior member are configured for engagement and for disengagement; and
    nesting the first cage base with a second cage base comprising a bottom and one or more walls, whereby the animal containment cage grommet is detached from the first cage base.

14. The animal containment cage unit of claim 1, wherein the one or more cage components or portions thereof are configured to be flattened by the nesting of the cage unit with another like cage unit.

15. The method of claim 12, wherein nesting comprises the first animal cage unit inserted into the second animal cage unit.

16. The method of claim 12, wherein nesting comprises the second animal cage unit inserted into the first animal cage unit.

* * * * *